(12) United States Patent
Hackemer

(10) Patent No.: US 7,791,825 B2
(45) Date of Patent: Sep. 7, 2010

(54) MACRO OBJECTIVE

(75) Inventor: Witold Hackemer, Bockenau (DE)

(73) Assignee: Jos. Schneider Optische Werke GmbH, Bad Kreuznach (DE)

( * ) Notice: Subject to any disclaimer, the term of this patent is extended or adjusted under 35 U.S.C. 154(b) by 7 days.

(21) Appl. No.: 12/258,256

(22) Filed: Oct. 24, 2008

(65) Prior Publication Data

US 2009/0135499 A1 May 28, 2009

(30) Foreign Application Priority Data

Oct. 26, 2007 (DE) .................. 10 2007 051 620

(51) Int. Cl.
 *G02B 9/34* (2006.01)
(52) U.S. Cl. ......................................... 359/772
(58) Field of Classification Search ............... 359/676, 359/686, 733, 772
See application file for complete search history.

(56) References Cited

U.S. PATENT DOCUMENTS

| 2,676,517 A | 4/1954 | Cook |
| 3,941,457 A | 3/1976 | Kawakami |
| 4,953,958 A | 9/1990 | Katsuma et al. |
| 5,537,259 A * | 7/1996 | Ogawa ................... 359/684 |
| 7,139,130 B2 | 11/2006 | Yamada |

OTHER PUBLICATIONS

Wynne, C.G., "Primary Aberrations and Conjugate Change," Proc. Phys. Soc. LXV, 6-B, Dec. 17, 1951, pp. 429-437.
Slyusarev, G.G., "Aberration and Optical Design Theory," 2nd Edition, Adam Hilger Ltd., Bristol, 4 pp.

* cited by examiner

*Primary Examiner*—Joseph Martinez
(74) *Attorney, Agent, or Firm*—IPXLAW Group LLP; Claude A. S. Hamrick

(57) ABSTRACT

A description is given of a macro objective (M) with a corrective compensation of aberrations (Continuous Aberration Suppression; CAS). The macro objective has a first positive optical subassembly (A), a second nearly afocal optical subassembly (B), a stop (APE), a third nearly afocal optical subassembly (B') and a fourth positive optical subassembly (A'). The third optical subassembly (B') and the fourth positive optical subassembly (A') are designed with mirror symmetry relative to the optical subassemblies (A, B) upstream of the stop (APE). The nearly afocal optical subassemblies (B, B') are displaced jointly inside the macro objective (M) along the optical axis (OA) with the aid of mechanical means in conjunction with linear magnifications of $\beta' \neq -1$. As a result, the macro objective (M) achieves outstanding imaging properties both over a wide range of linear magnifications ($\beta'=-2.0$ to $-0.5$) and over a wide wavelength spectrum.

20 Claims, 29 Drawing Sheets

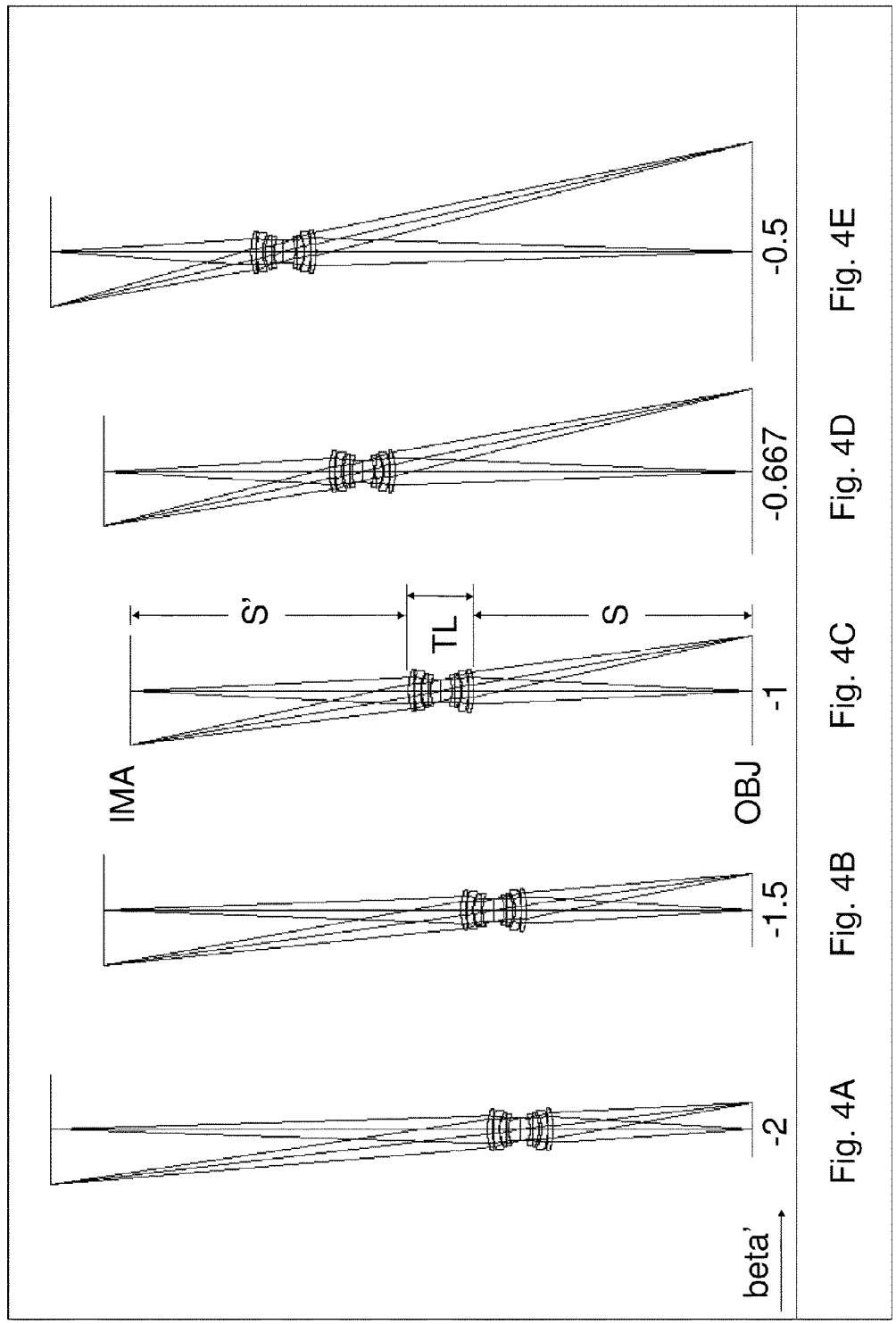

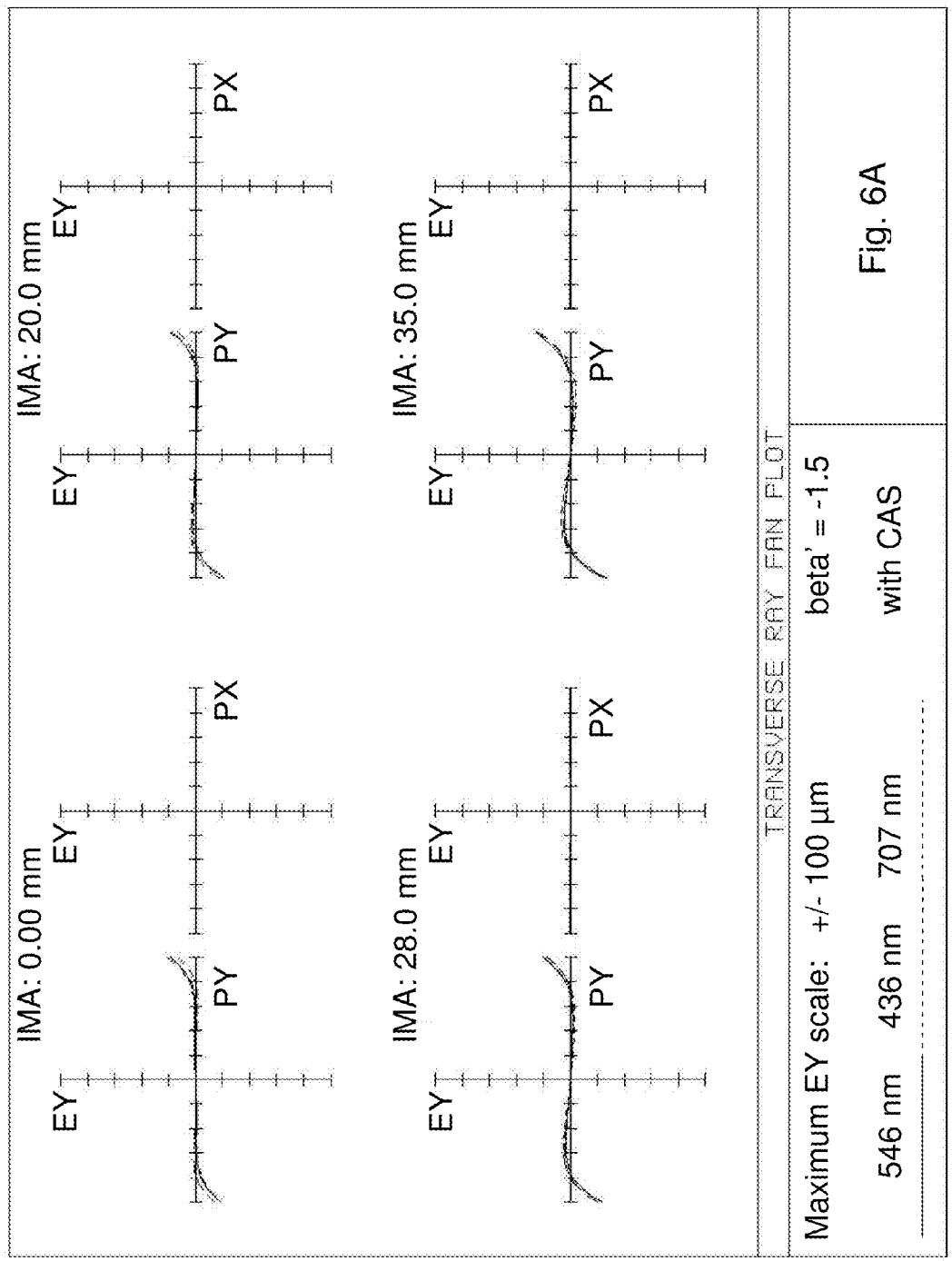

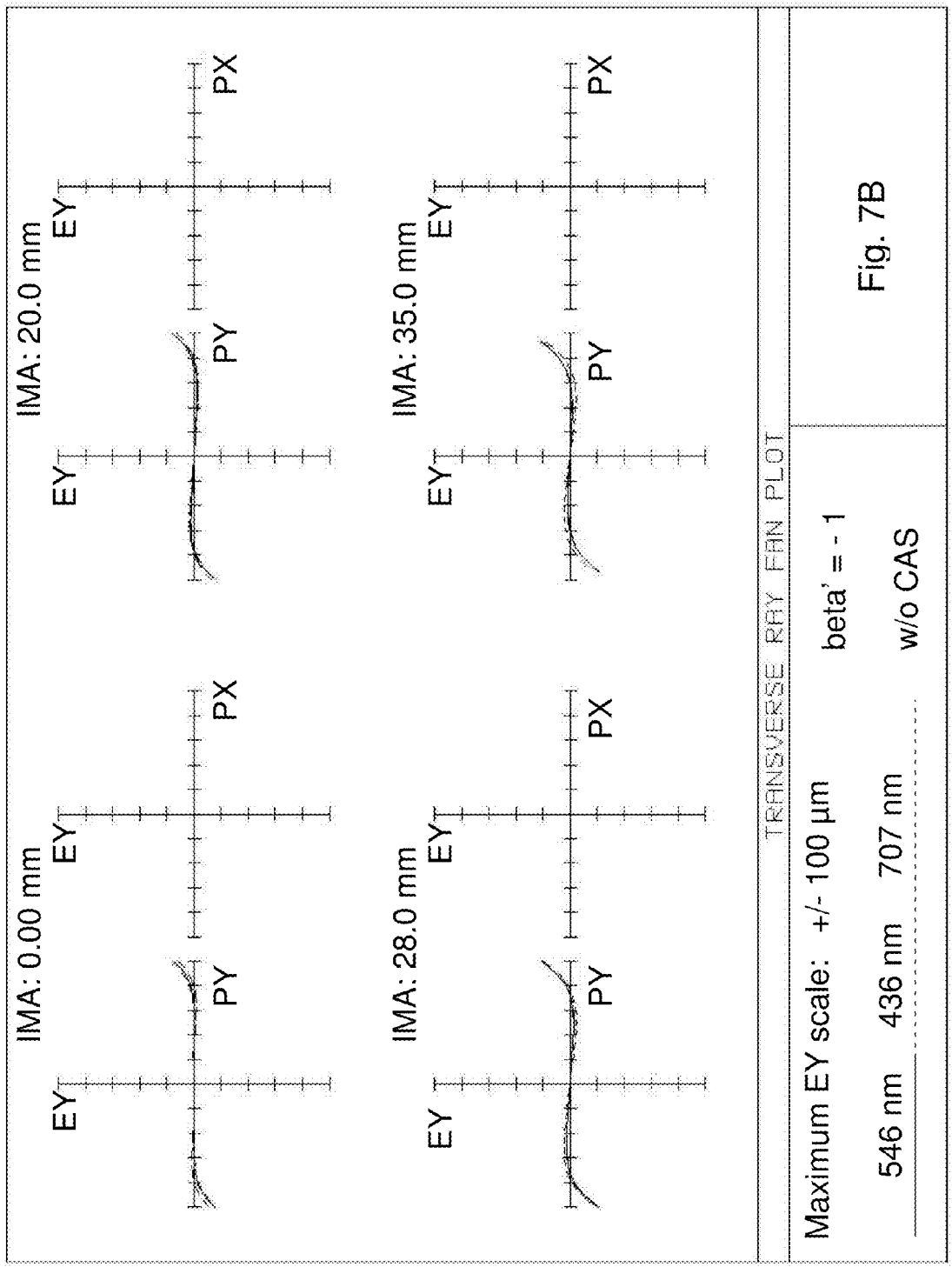

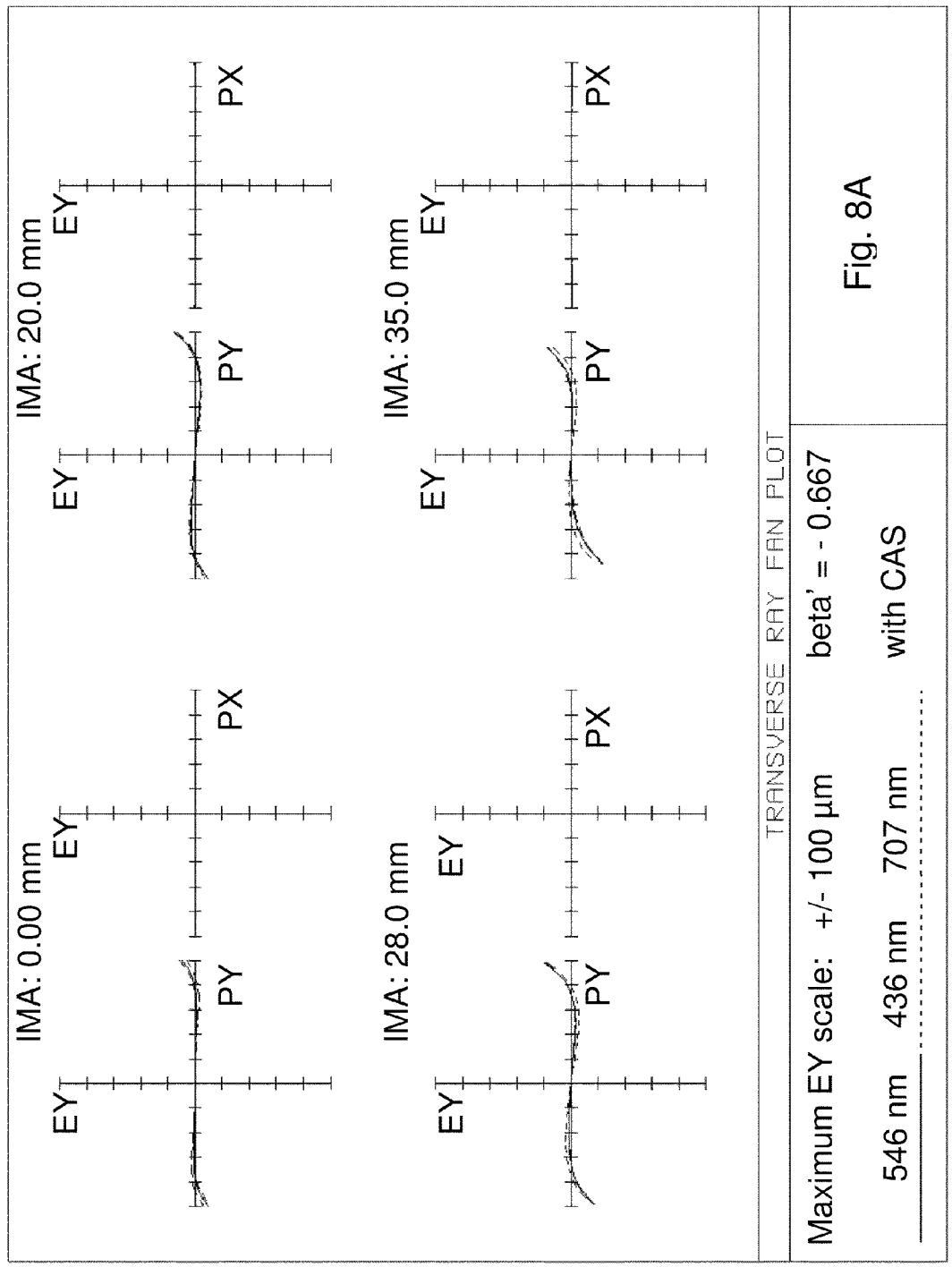

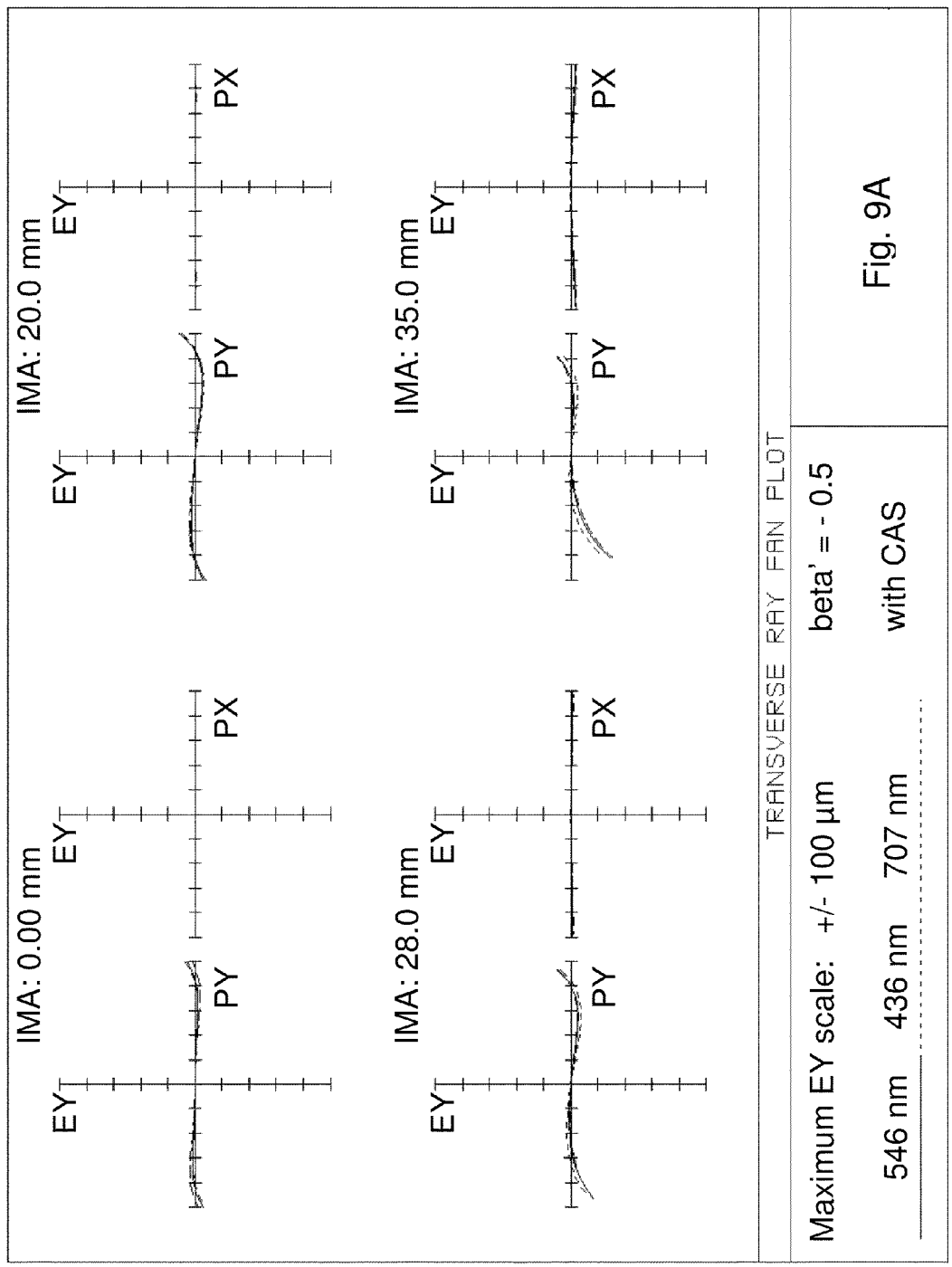

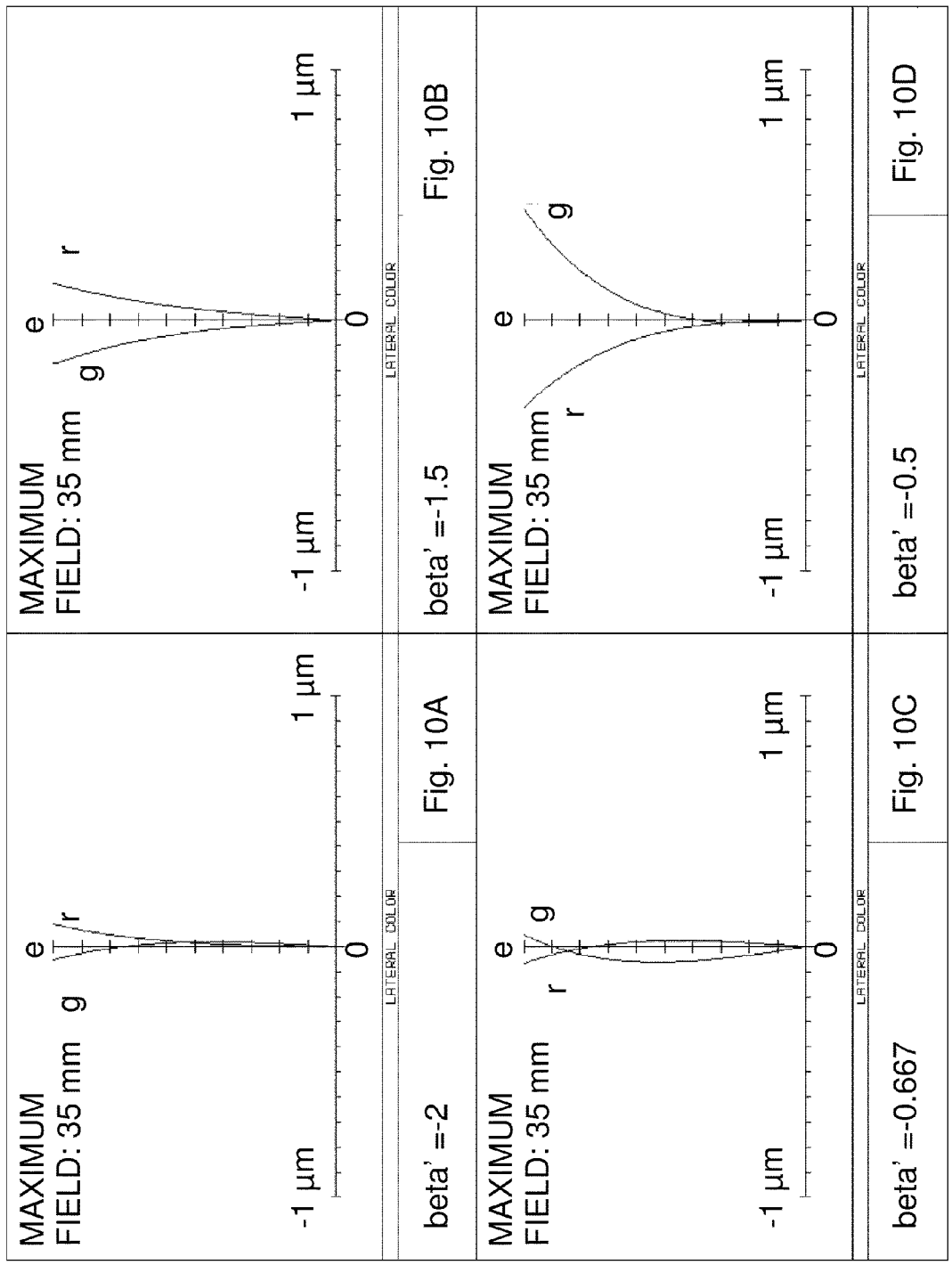

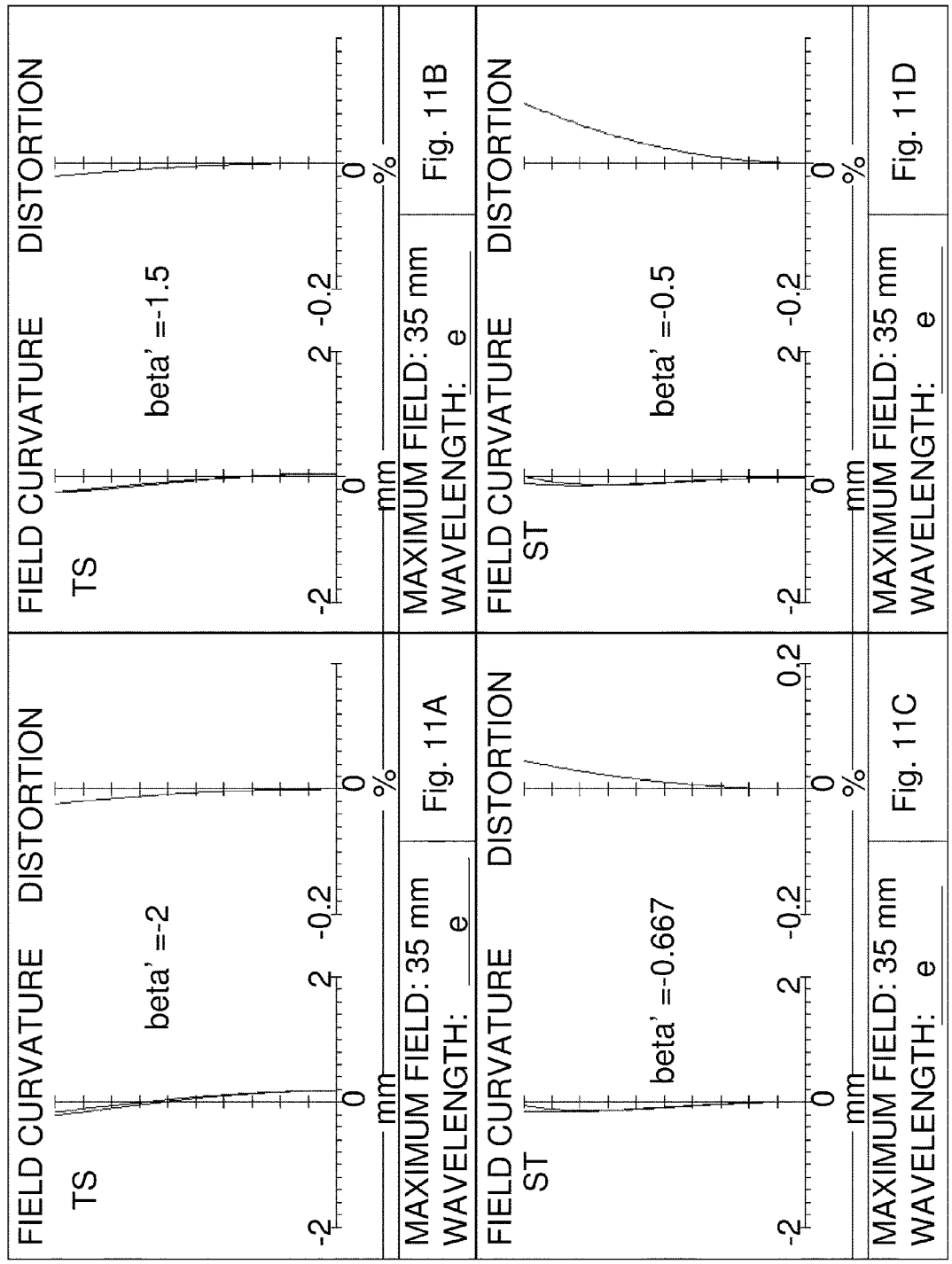

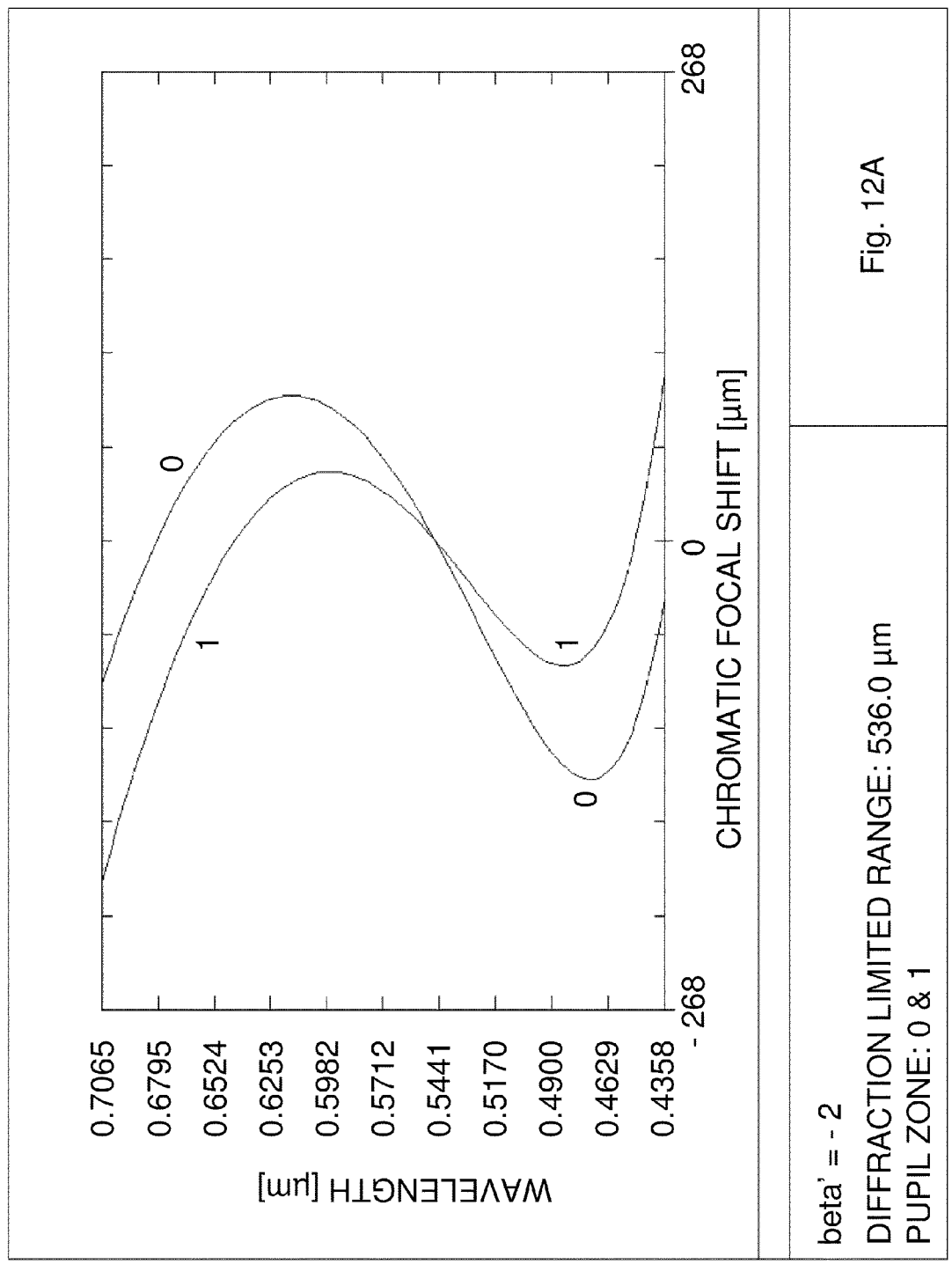

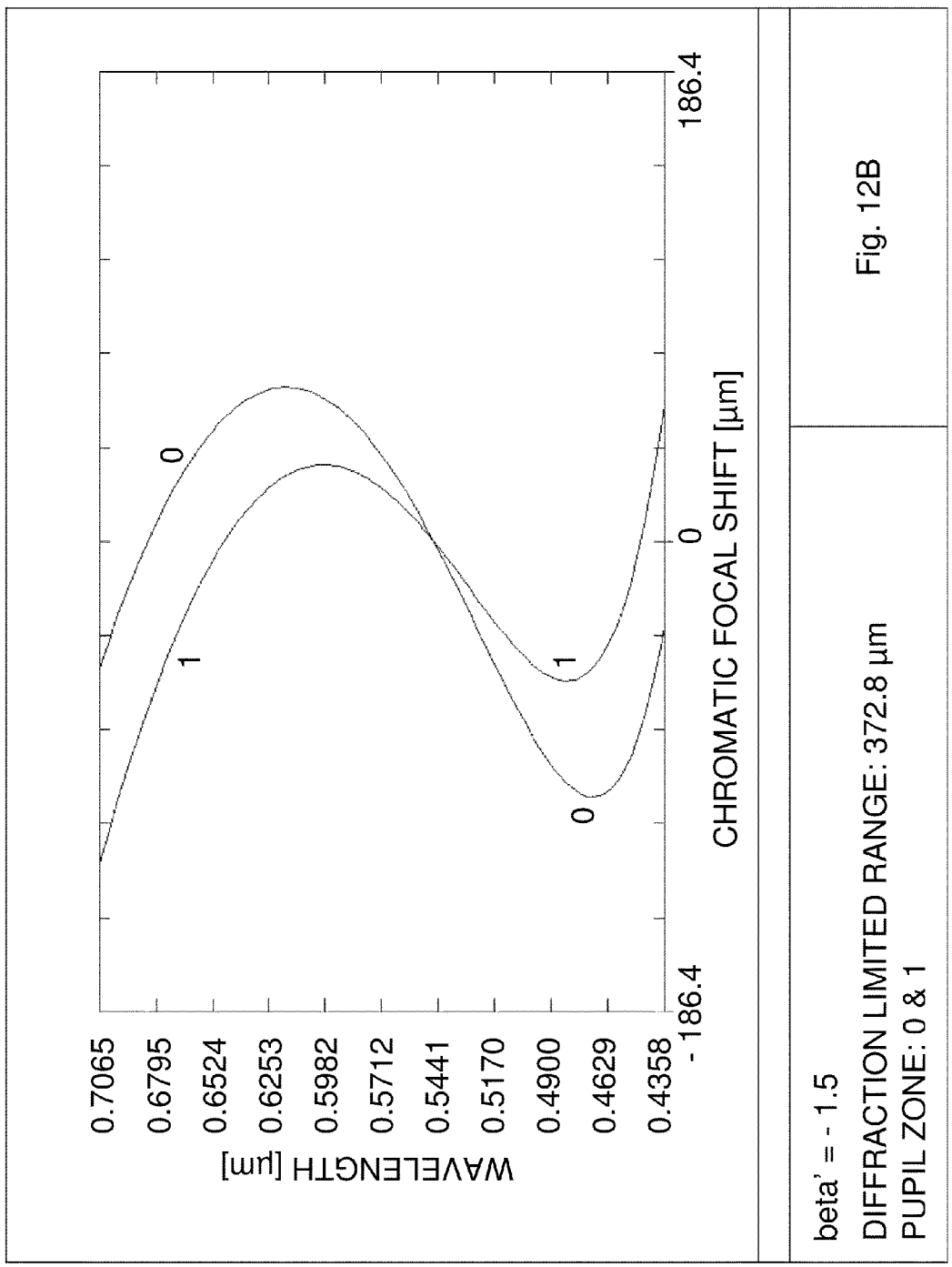

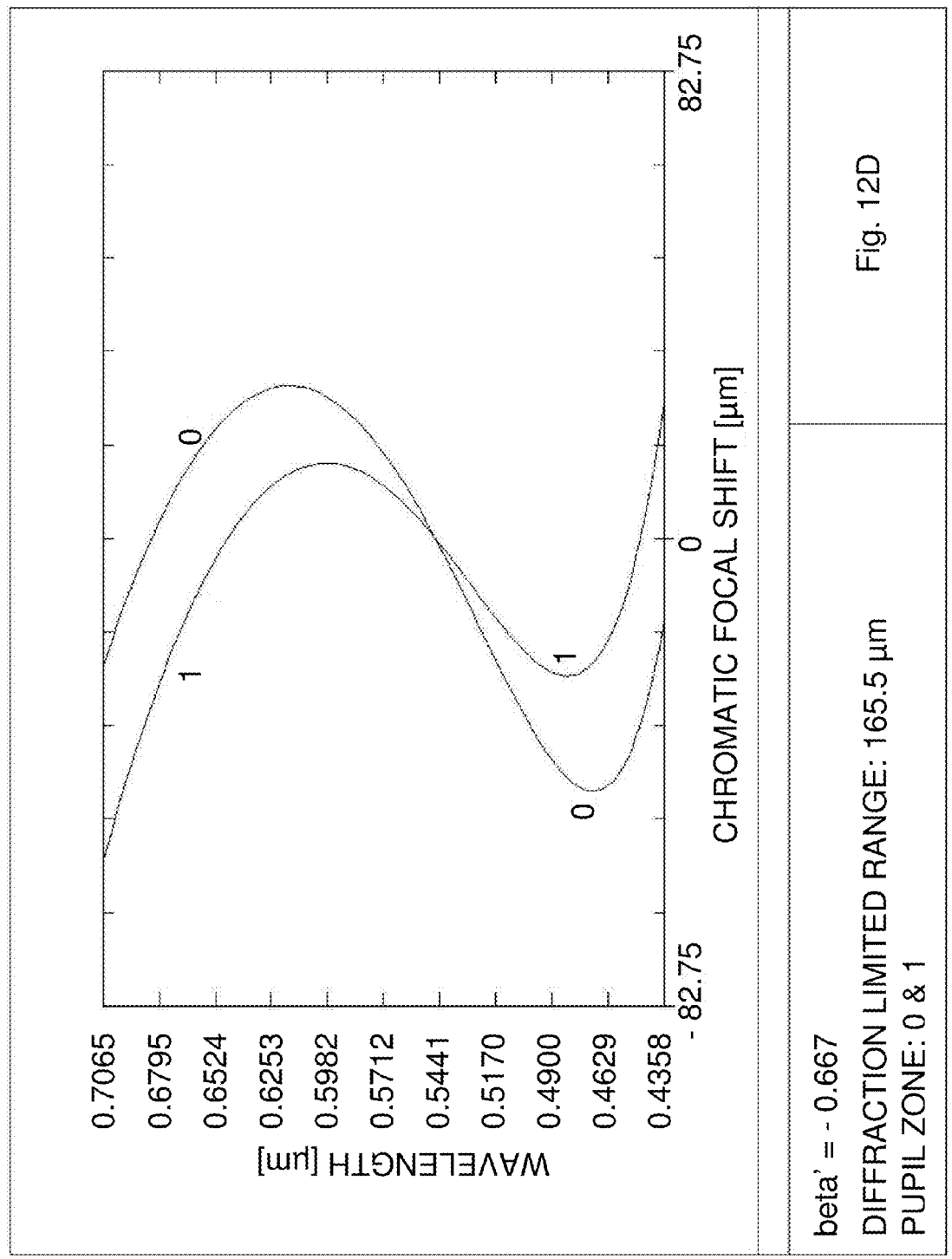

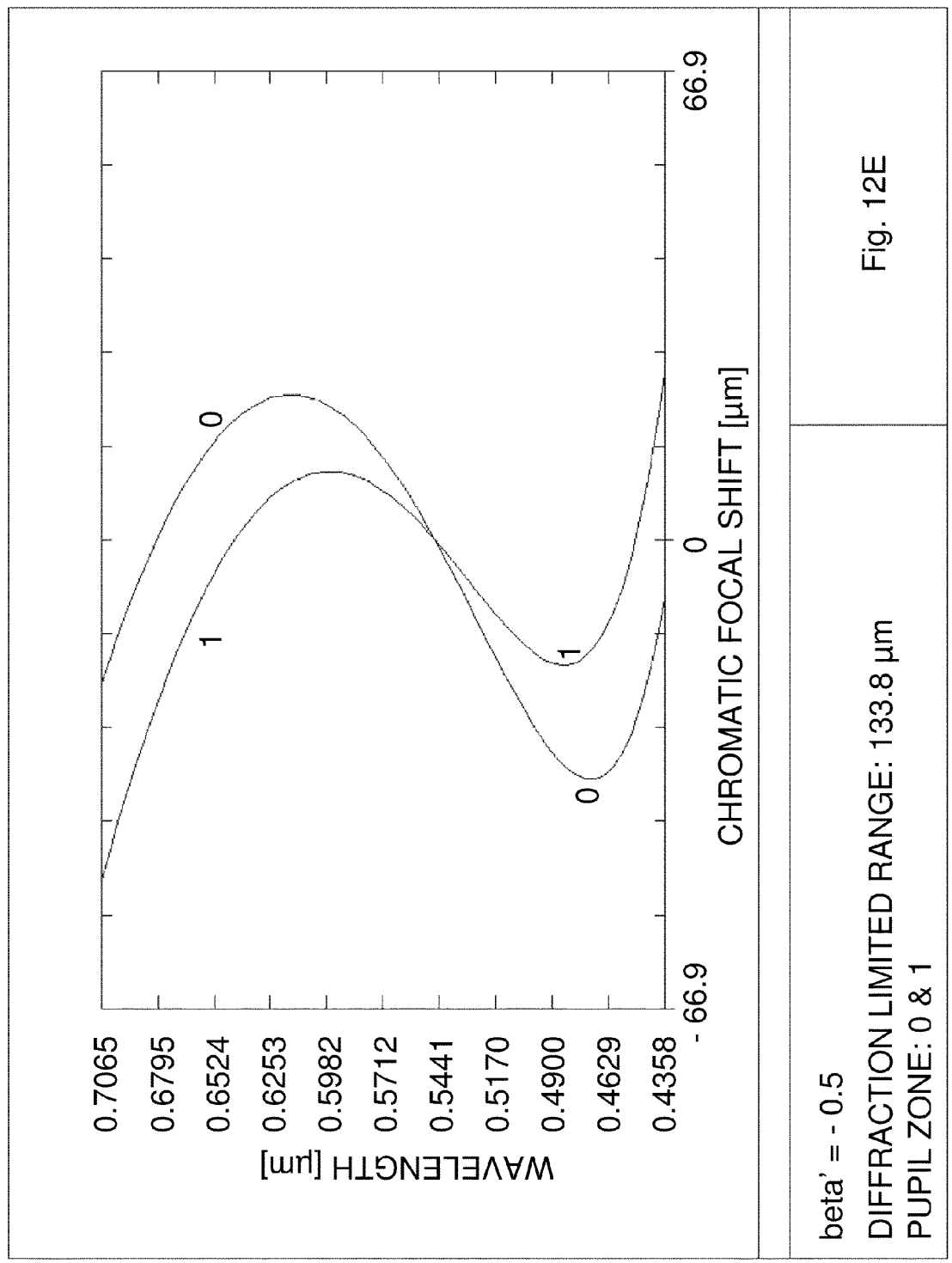

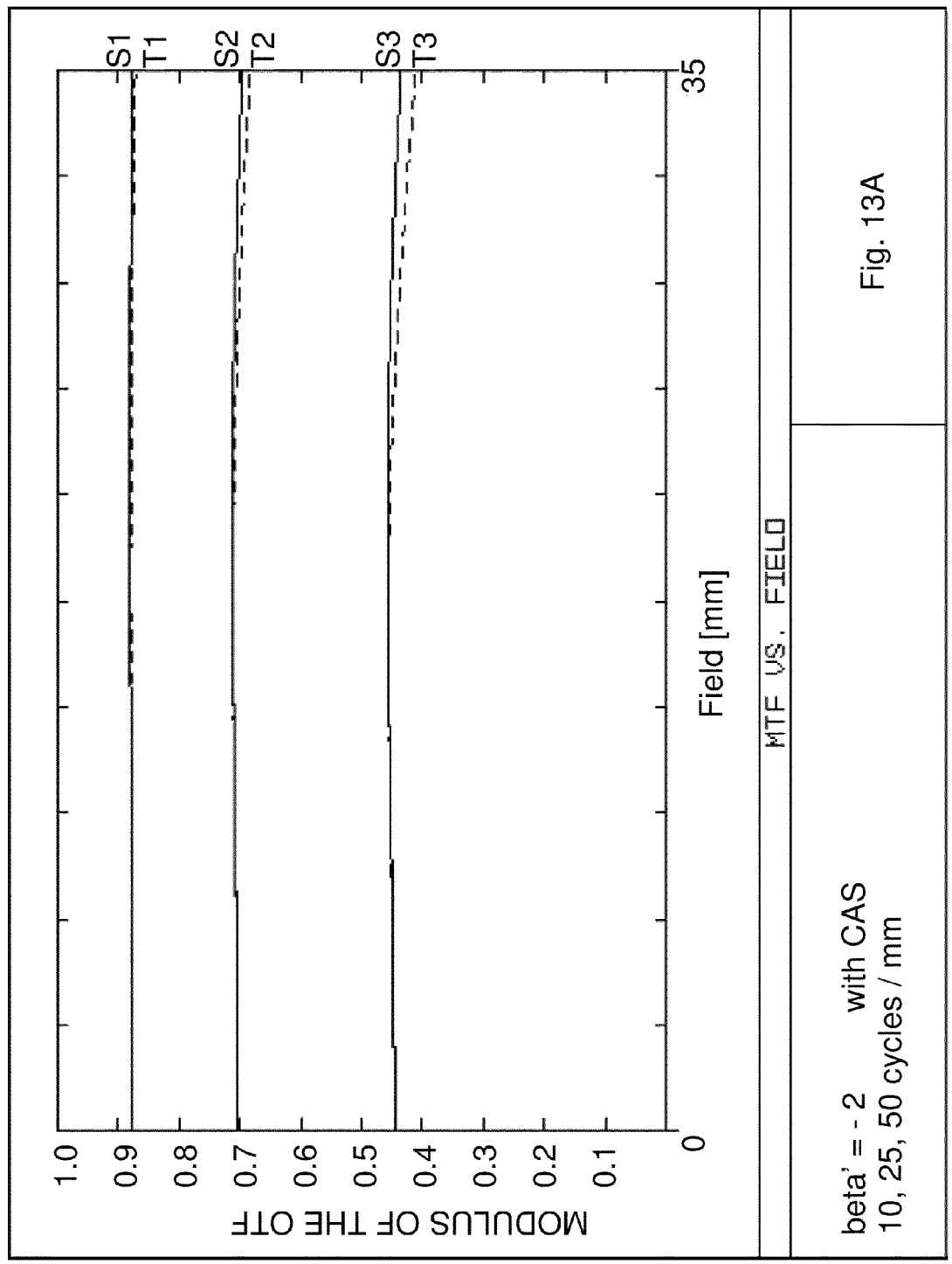

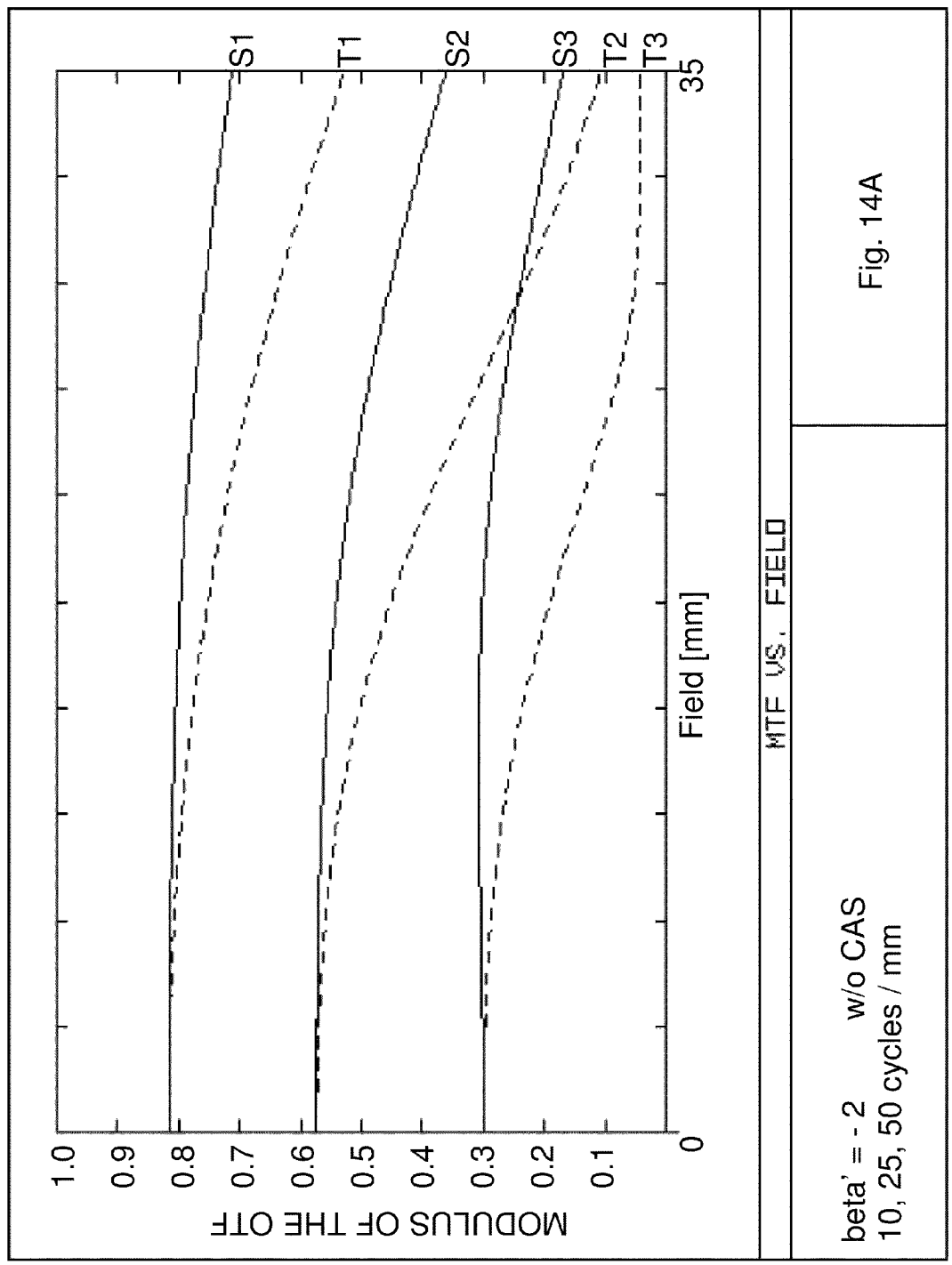

MACRO OBJECTIVE

FIELD OF THE INVENTION

The invention relates to a macro or reproduction objective with a very large linear magnification range of $\beta'=-0.5$ to $\beta=-2$. Such objectives are applied industrially, for example in the inspection of LCD displays in the course of the various production sections. It is important in this case to detect defects and determine their actual size. Satisfactory correction of distortion is advantageous to this extent.

PRIOR ART AND OBJECT FOLLOWING THEREFROM

A whole range of macro objectives with a large linear magnification range ($\beta'$ range) are known. These include, for example, such objectives as:

process lenses (Celor/Syntor type; 4-lens) with an initial aperture k=16 and a working aperture 22-64. An improved variant for this purpose is an 8-lens type with k=8.0 and a working aperture of k=16 (Zeiss-Germinare, DD 207 268 B1), and objectives of the Orthometar type and their derivatives having less rigorous distortion correction and color correction, which can be employed universally owing to a relatively low f-stop (for example k=5.6 to 8) (see, for example, U.S. Pat. No. 3,941,457).

By comparison with classic types of photographic objectives, these system types exhibit: a less pronounced focal aberration profile, and are thus attended in a symmetric (1:1) design by the precondition for a better imaging performance in reprographic tasks with a variable linear magnification.

In the correction of such objectives, the entire technical effort is devoted to suppressing the spherochromatism of the chief rays.

The uncorrectable coma errors (meridional coma, sagittal errors) which are known in the theory of imaging and arise after a change in linear magnification (refocusing), led very quickly to a loss in imaging quality. Since the coma term responsible for the asymmetry of the caustic is related to the second power of the system aperture, a tolerable imaging performance could be achieved by strongly stopping down the aperture (often to the diffraction limit) for the low spatial frequencies of a few line pairs per mm that are typical of the abovenamed repro process.

Thus, a reproduction objective can essentially be optimally corrected only for a linear magnification $\beta'_0$. The aspects of the refocusing and their influence on the aberrations are treated, inter alia, in the following literature:

(1) Maréchal, A.: Optique geometrique generate [General Geometric Optics]
   in Handbuch der Physik [Textbook of Physics] (published by S. Flügge), Vol. XXIV, Grundlagen der Optik [Fundamentals of Optics], Springer Verlag, Berlin 1956

(2) Dietzsch, E.: Zur Tiefenabbildung der Pupille [Concerning depth imaging of the pupil], Feingerätetechnik 26 (1977) 1, pages 3-5

(3) Slyusarev, G. G.: Aberration and Optical Design Theory, Adam Hilger Ltd., Bristol 1984

(4) Wynne, C. G.: Proc. Phys. Soc. 65B 429-437 (1952)

When, for the purpose of being set to another $\beta'$ value, such an objective has to be axially displaced (total focusing), this produces aberrations that, depending on their type and size, disturb the imaging process, or even render it impossible. According to the theory of aberrations, an objective that is corrected for a linear magnification $\beta'_0$ and, in order to reach a new $\beta'$, where $|\beta'|>|\beta'_0|$, must therefore be displaced (refocused) nearer to the object, generally exhibits, inter alia, the following aberrations (=refocusing aberrations):

(a)—spherical undercorrection
(b)—exterior coma
(c)—astigmatism (overcorrection, given corrected distortion and when the pupil linear magnification is $\beta_P>1$)
(d)—distortion and color magnification error (uncorrected pupil imaging in the typical case).

The points a and c lose their importance for objectives of average f-stop (e.g. k=5.6) that exhibit a symmetrical lens design with reference to the aperture stop in the system (pupils at nodal points, pupil linear magnification $\beta'_p=1$).

If sufficient attentiveness and means are devoted to the problem of the spherochromatism of the pupil imaging in the system correction process, the distortion and the transverse chromatic aberration can very largely be fashioned invariantly in terms of linear magnification.

A particular position is occupied in the hierarchy of optical aberrations by the coma, which is related in the Seidel domain to the square of the system aperture, and linearly to the field coordinate.

According to Maréchal and Dietzsch, the formula for the analytical coma coefficient can be written in the following form as a function of the object distance, the variables occurring being pupil-referred.

$$C = C_o - \left[2 \cdot (A_o + W_o) - \frac{n}{2h\omega}\left(\frac{h'\omega'}{p'} - \frac{h\omega}{p}\right)\right] \cdot \left(\frac{1}{p} - \frac{1}{p_o}\right)$$

In this case:
C signifies a coma coefficient
$C_o$ signifies the coma coefficient in the initial position (correction configuration)
$A_o$ signifies the astigmatism (astigmatic error) in their initial position
$W_o$ signifies the mean field of curvature in the initial position.
Unprimed variables are variables referred to object space, while primed variables are referred to image space.
n,n' is the refractive index
h,h' is the pupil height
$\omega,\omega'$ is the field angle
$p_o$=distance of the object plane from the entrance pupil EP in the correction configuration
$p=s-s_p$ is the distance of the object plane from the entrance pupil EP after refocusing
$p'=s'-s_p$ is the distance of the image plane from the exit pupil AP after refocusing
$s,s_p$ are the object back focus and EP back focus, both referred to the first system vertex (in light direction (LiRi))
$s',s'_p$ are the back focus and EP back focus, both referred to the last system vertex (in LiRi).

Assuming that the objective is corrected for an object position (correction configuration), that is to say $C_o$, $A_o$, and $W_o$, are to vanish, the formula discussion supplies the information relating to the required precondition for which the coma coefficient C vanishes after displacement of the object, that is to say there could be prospects of coma correction.

This would then be the case, when $$\frac{h'\omega'}{p'} = \frac{h\omega}{p}.$$

It follows therefrom and from the Helmholtz-Lagrange invariant $$\beta' = \frac{n \cdot u}{n' \cdot u'} \text{ and } \beta'_p = \frac{n \cdot \omega}{n' \cdot \omega'}$$

that:

$$\beta' = \left(\frac{n}{n'}\right)^2 \cdot \frac{1}{\beta'_p}.$$

For the case n'=n typical of reproduction, this means that the object and pupil magnifications must be inverse, that is to say the linear magnification remains unchanged in the event of a displacement of object and image (refocusing).

This explains the necessity for a change in the system structure when the aim is to obtain continuous correction of the coma for different β' values.

A particularly efficient technical implementation of the abovenamed change in system structure (aberration compensation) is the subject matter of this invention.

SOLUTION TO THE PROBLEM

This object is achieved by the invention with the aid of the features of the independent claim. Advantageous developments of the invention are characterized in the subclaims. The wording of all the claims is hereby included in this description by reference. The invention also covers all rational, and in particular all mentioned combinations of independent and/or dependent claims.

A macro objective is proposed that has the following elements when viewed in the specified sequence from the object side:

b1) a first positive optical subassembly;
b2) a second optical subassembly with reduced refractive power;
b3) a third optical subassembly with reduced refractive power;
b4) a fourth positive optical subassembly.

Here, the inventive macro objective has mechanical means for jointly displacing the second and third nearly afocal optical subassemblies inside the macro objective along the optical axis, the spacing between the two subassemblies remaining constant during the displacement.

A further inventive property is the position of the aperture stop, which is located at the same spacing in a stationary fashion (the subassemblies 2 and 3 thus not also being moved) from the first lens vertex of the first subassembly and from the last lens vertex of the last subassembly.

The system is holosymmetrical when β'=−1, that is to say the distance of the last lens vertex of the second (nearly afocal) subassembly from the stop plane is equal to the distance of the first lens vertex of the third subassembly from the stop plane.

The displacement of the two middle subassemblies in addition to the total focusing effects a continuous correction of the aberration (Continuous Aberration Suppression; CAS), the result being that the imaging properties are nearly perfect for all linear magnifications. In relation to each linear magnification β', there is an optimum position of the two middle optical subassemblies for which the aberrations are minimized. The total length of the macro objective thus remains unchanged during the joint displacement of the second and third afocal optical subassemblies.

An additionally advantageous property is that during the joint displacement of the second and third nearly afocal optical subassemblies, the focal length of the macro objective changes by at most $10^{-5}$ multiplied by the focal length of the macro objective given a symmetrical position of the second and third optical subassemblies inside the macro objective. That is to say, the relative variation in focal length of the proposed macro objective referred to the focal length f' for β'=−1 does not exceed the following value in the entire linear magnification range:

$$\frac{\Delta f'_{max}}{f'_{\beta'=-1}} = \frac{f'_{max} - f'_{min}}{f'_{\beta'=-1}} < 1 \cdot 10^{-5}$$

Here, $f'_{max}$ and $f'_{min}$ are correspondingly the longest and the shortest system focal length from the linear magnification range of β'=−0.5 to β'=−2.

This enables the user to calculate exactly the change in the objective position in relation to the object plane and imaging plane for defined values of lateral linear magnifications, using the known rules of Gaussian optics.

In an advantageous design, the inventive macro objective has the following elements when viewed in the specified sequence from the object plane:

a) a first positive optical subassembly, comprising
a1) a first positive lens, and
a2) a second negative lens;
b) a second nearly afocal optical subassembly, comprising
b1) a third positive lens, and
b2) a fourth negative lens;
c) a stop;
d) a third nearly afocal optical subassembly;
e) a fourth positive optical subassembly.

The third optical subassembly and the fourth positive optical subassembly are designed with mirror symmetry relative to the optical subassemblies upstream of the stop.

In a further advantageous design, the inventive macro objective has the following elements when viewed in the specified sequence from the object plane:

a) a first positive optical subassembly, comprising
a1) a first positive meniscus lens, and
a2) a second negative meniscus lens;
b) a second nearly afocal optical subassembly, comprising
b1) a third positive biconvex lens, and
b2) a fourth negative biconcave lens;
c) a stop;
d) a third nearly afocal optical subassembly;
e) a fourth positive optical subassembly;

the third optical subassembly and the fourth positive optical subassembly being designed with mirror symmetry relative to the optical subassemblies upstream of the stop.

A further advantageous design of the inventive macro objective is defined by the fact that it has the following elements when viewed in the specified sequence from the object plane:

a) a first positive optical subassembly, comprising
a1) a first positive meniscus lens, the convex surface thereof pointing in the direction of the object plane, and the concave surface pointing in the direction of the image plane, and a2) a second negative meniscus lens, the convex surface thereof pointing in the direction of the object plane, and the concave surface pointing in the direction of the image plane, b) a second nearly afocal optical subassembly, comprising b1) a third positive biconvex lens, the more strongly curved first convex surface thereof pointing in the direction of the object plane, and the second more weakly curved convex surface pointing in the direction of the image plane, and b2) a fourth negative biconcave lens, the less strongly curved first concave surface thereof pointing in the direction of the object plane, and the second more strongly curved concave surface pointing in the direction of the image plane;

c) a stop;

d) a third optical subassembly;

e) a fourth positive optical subassembly.

In this case, the third optical subassembly and the fourth positive optical subassembly are designed with mirror symmetry relative to the optical subassemblies upstream of the stop.

In an advantageous design, the proposed macro objective is fashioned such that the radii, thicknesses, media refractive indices n and Abbe numbers ν of the lenses have the following value ranges in accordance with FIG. 2 (Table 1).

TABLE 1

| Reference symbol n | Radius R [in units of system focal length $f'_e$] | Thickness d [in units of the system focal length $f'_e$] | Media refractive index $n_d$ | Abbe number $\nu_d$ |
|---|---|---|---|---|
| R1 | 0.36 < R1 < 0.44 | | | |
| d1 | | 0.030 < d1 < 0.040 | 1.882997 | 40.76 |
| R2 | 0.93 < R2 < 1.14 | | | |
| R3 | 0.36 < R3 < 0.44 | | | |
| d3 | | 0.034 < d3 < 0.042 | 1.613360 | 44.49 |
| R4 | 0.19 < R4 < 0.24 | | | |
| R5 | 0.20 < R5 < 0.25 | | | |
| d5 | | 0.038 < d5 < 0.048 | 1.592400 | 68.40 |
| R6 | −5.9 < R6 < −4.8 | | | |
| d6 | | 0.12 < d6 < 0.015 | 1.637750 | 42.41 |
| R7 | 0.23 < R7 < 0.29 | | | |
| b, c | | 0.12 < (b + c) < 0.15 | | |

The radii R and distances d are expressed in this case in units of $f'_e$, $f'_e$ being the objective focal length from the wavelength λ=546.074 nm. The media refractive indices n and Abbe numbers ν are specified for the Fraunhofer line d, that is to say for the wavelength λ=587.5618 nm.

The known Fraunhofer lines g, e and r are characterized by the following wavelengths λ:

| Fraunhofer line | Wavelength λ [nm] |
|---|---|
| g | 435.8343 |
| e | 546.074 |
| r | 706.5188 |

The relationships between the radii and thicknesses of the lenses can be displaced relative to one another within the ranges specified in Table 1. That is to say the values for the radii and thicknesses need not be varied in a fashion proportional to one another.

The macro objective has an image circle diameter $2y'_{max}$ of at least $0.7 \cdot f'_e$. It has a maximum meridional extent of the pencil $|y_{APE}^+|+|y_{APE}^-|$ in the location of the aperture stop and reaches the following values during the imaging of the image-side field point, likewise located in the meridional plane, having a coordinate $y'=0.35 \cdot f'_e$:

TABLE 2

| β' | $y_{APE}^+$ | $y_{APE}^-$ | $|y_{APE}^+|+|y_{APE}^-|$ |
|---|---|---|---|
| −0.5 | $0.0586 \cdot f'_e$ | $-0.0586 \cdot f'_e$ | $0.1172 \cdot f'_e$ |
| −0.667 | $0.0625 \cdot f'_e$ | $-0.0625 \cdot f'_e$ | $0.1250 \cdot f'_e$ |
| −1 | $0.0680 \cdot f'_e$ | $-0.0680 \cdot f'_e$ | $0.1360 \cdot f'_e$ |
| −1.5 | $0.0715 \cdot f'_e$ | $-0.0715 \cdot f'_e$ | $0.1430 \cdot f'_e$ |
| −2 | $0.0715 \cdot f'_e$ | $-0.0715 \cdot f'_e$ | $0.1430 \cdot f'_e$ |

The meridional plane contains the object point and the optical axis of the objective. As may be seen, the macro objective has only a very low vignetting.

For all the values of the linear magnification from the range of β'=−0.5 to −2.0, the proposed macro objective has an image height $y'_e$, which is defined by the centroid ray of the major color e as the intersection coordinate in the imaging plane and for its part satisfies the following condition:

$$0 < |y'_e| \leq 0.35 \cdot f'_e.$$

Here, a height difference $|y'_\lambda - y'_e|$ formed for a centroid ray of any desired wavelength λ, where g<λ<r, does not exceed the value $4.5 \cdot 10^{-6} \cdot f'_e$, and it therefore always holds that:

$$|y'_\lambda - y'_e| \leq 4.5 \cdot 10^{-6} \cdot f'_e.$$

This yields a transverse chromatic aberration of less than 0.45 μm for a typical focal length of $f'_e$ of 100 mm!

Furthermore, the described macro objective has the following advantageous property for all linear magnification values from the range of −0.5 to −2.0: a centroid ray of the major color e may be considered. For this, $y'_e$ denotes the intersection coordinate in the imaging plane, that is to say the image height $y'_e$.

For image heights that lie in the range $$0 < |y'_e| \leq 0.35 \cdot f'_e,$$

these deviate only by less than 1 promille from the ideal image height $y'_{e,parax}$ prescribed by the laws of Gaussian optics. Thus, the relationship holds that:

$$\frac{y'_e - y'_{e,parax}}{y'_{e,parax}} \leq 0.001.$$

The macro objective thus has an outstanding orthoscopy in the entire linear magnification range.

The longitudinal chromatic aberration of the inventive macro objective lies inside a wave-optical depth of field of $$b'_{0.8} = \pm 2 \cdot \lambda \cdot k_{eff}.$$

for the rays of all pupil zones and all wavelengths from the spectral range g<λ<r.

Here, $k_{eff}$ is the effective f-stop, which is related to the f-stop $k_\infty$ in the case of imaging from infinity, as follows:

$$k_{eff} = k_\infty \left(1 - \frac{\beta'}{\beta'_p}\right).$$

Here, $\beta'_p$ is the pupil linear magnification.

$$B'_p = \frac{D_{AP}}{D_{EP}}$$

$D_{AP}$=parameter of exit pupil
$D_{EP}$=diameter of entrance pupil.

The following advantages result in summary for the inventive macro objective:
- a very large linear magnification range from $\beta'$=−0.5 to −2;
- a high aperture (or small f-stop k=4.0 to 5.2) or high values of the object-side and the image-side numerical apertures (NA and NA'), which particularly influence the resolution and the position of the physical diffraction limit;
- a maximum imaging performance as early as the initial opening (open aperture stop);
- high values of the relative illuminance in the field;
- extreme retention of orthoscopy (freedom from distortion) when there is a change of magnification (distortion <0.1%);
- a color magnification error of nearly zero in the broad spectrum from g to r in the entire linear magnification range; and
- a longitudinal chromatic aberration within the wave-optical depth of field in the spectrum from g to r.

Further details and features emerge from the following description of preferred exemplary embodiments in conjunction with the subclaims. Here, the respective features can be embodied purely for themselves or severally in combination with one another. The options for achieving the present object are not restricted to the exemplary embodiments. Thus, for example, even specifications of range always comprise all intermediate values, not given, or all conceivable subintervals.

The exemplary embodiments are illustrated schematically in the figures. Identical reference numerals in the individual figures in this case denote identical or functionally identical elements, or elements that correspond to one another with regard to their functions. In detail:

FIG. 4 shows the macro objective in five configurations for the linear magnifications $\beta'$=−2.0, −1.5, −1.0, −0.667 and −0.5

FIG. 4A shows the macro objective in a configuration for the linear magnification $\beta'$=−2.0;

FIG. 4B shows the macro objective in a configuration for the linear magnification $\beta'$=−1.5;

FIG. 4C shows the macro objective in a configuration for the linear magnification $\beta'$=−1.0;

FIG. 4D shows the macro objective in a configuration for the linear magnification $\beta'$=−0.667;

FIG. 4E shows the macro objective in a configuration for the linear magnification $\beta'$=−0.5;

Figure 5A:
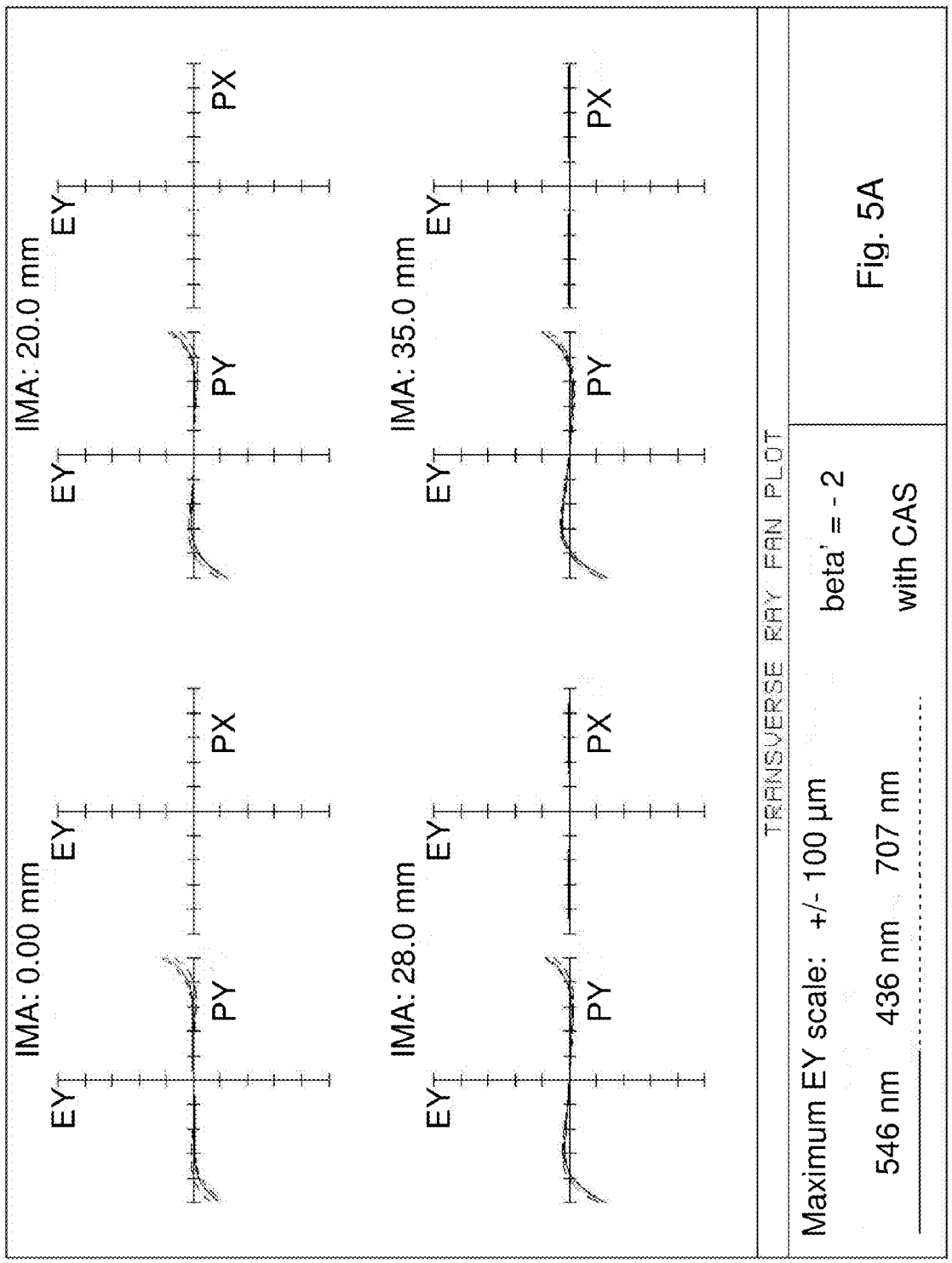
Figure 5B:
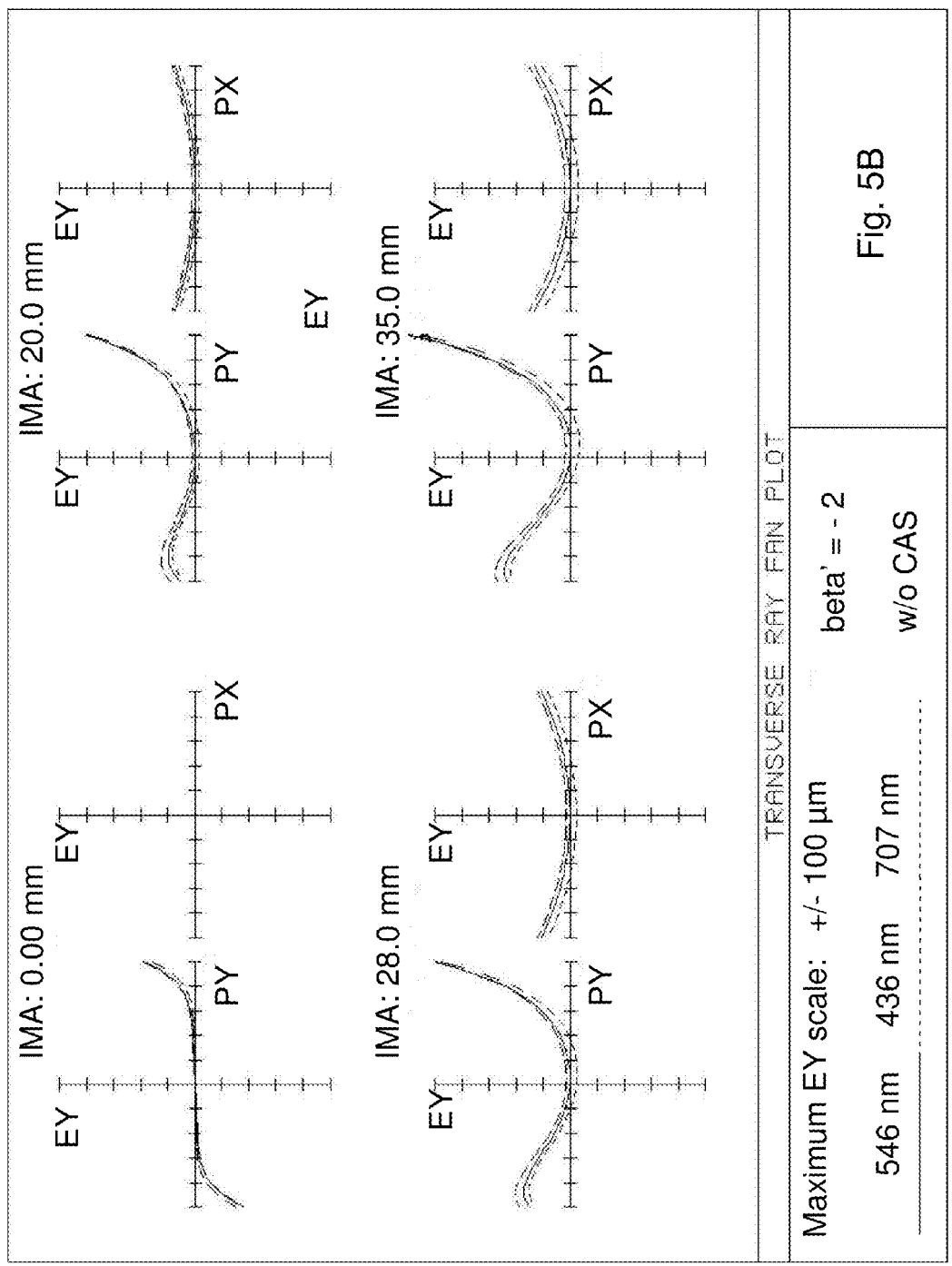
Figure 6B:
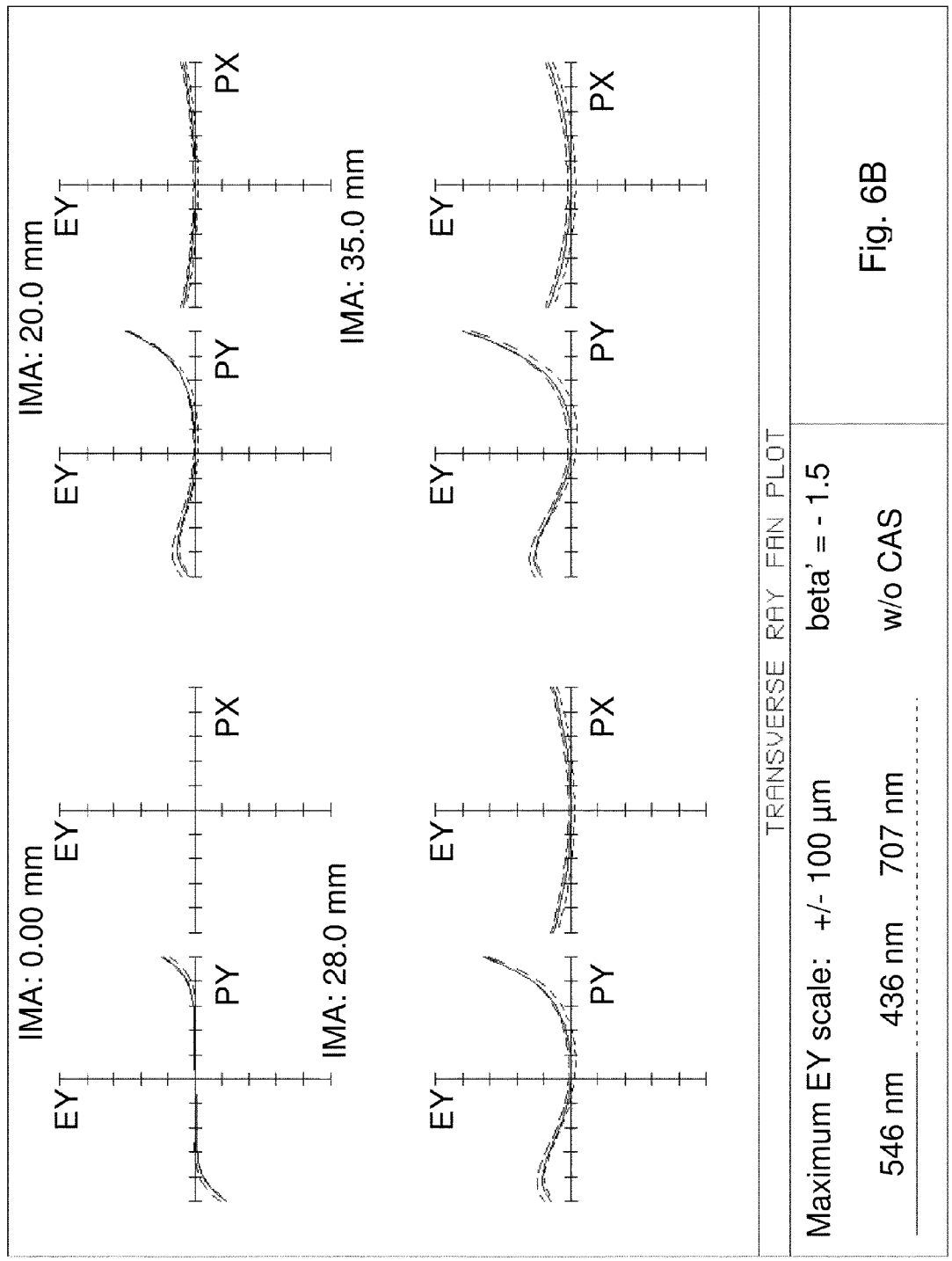
Figure 7A:
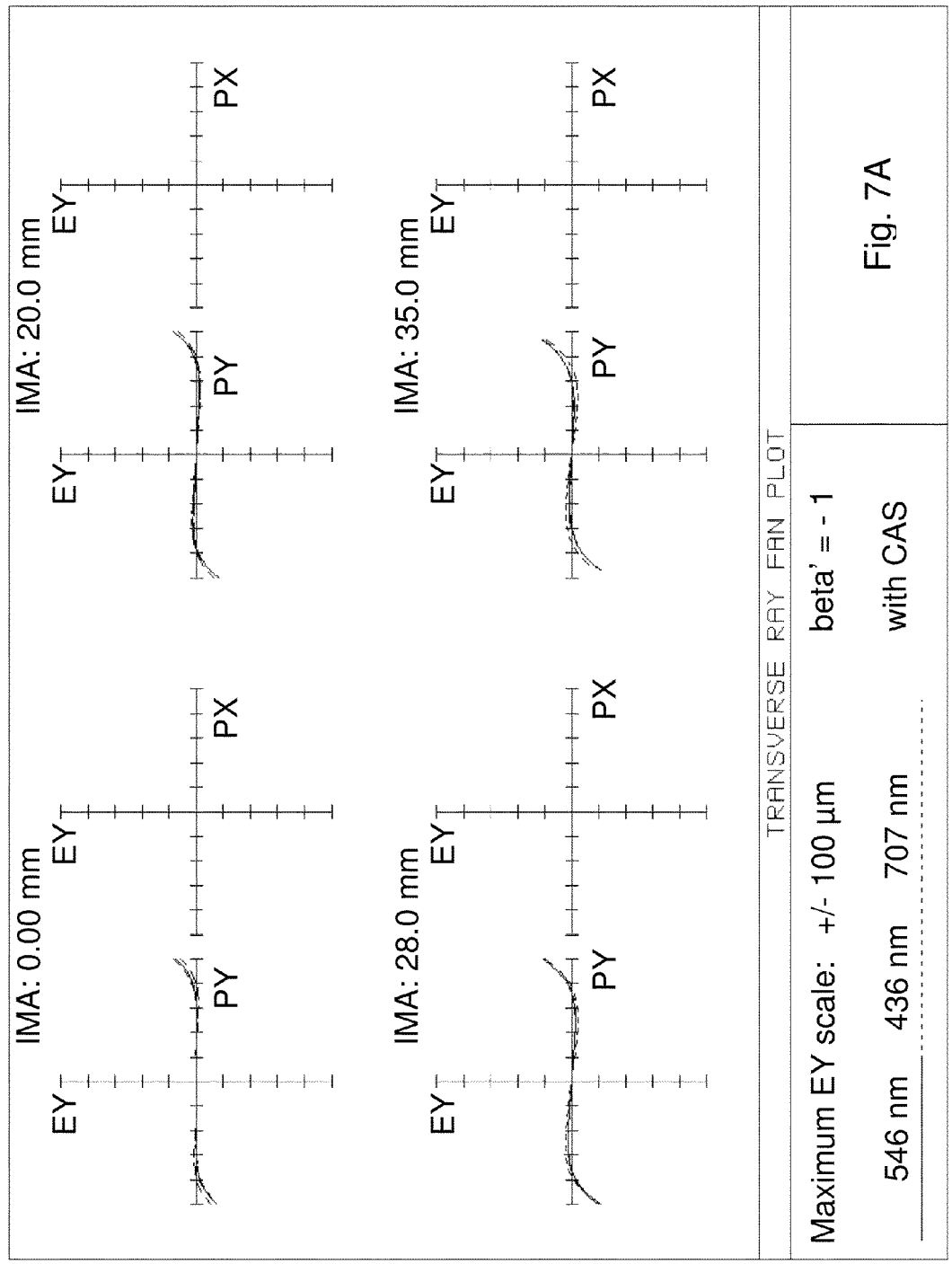
Figure 8B:
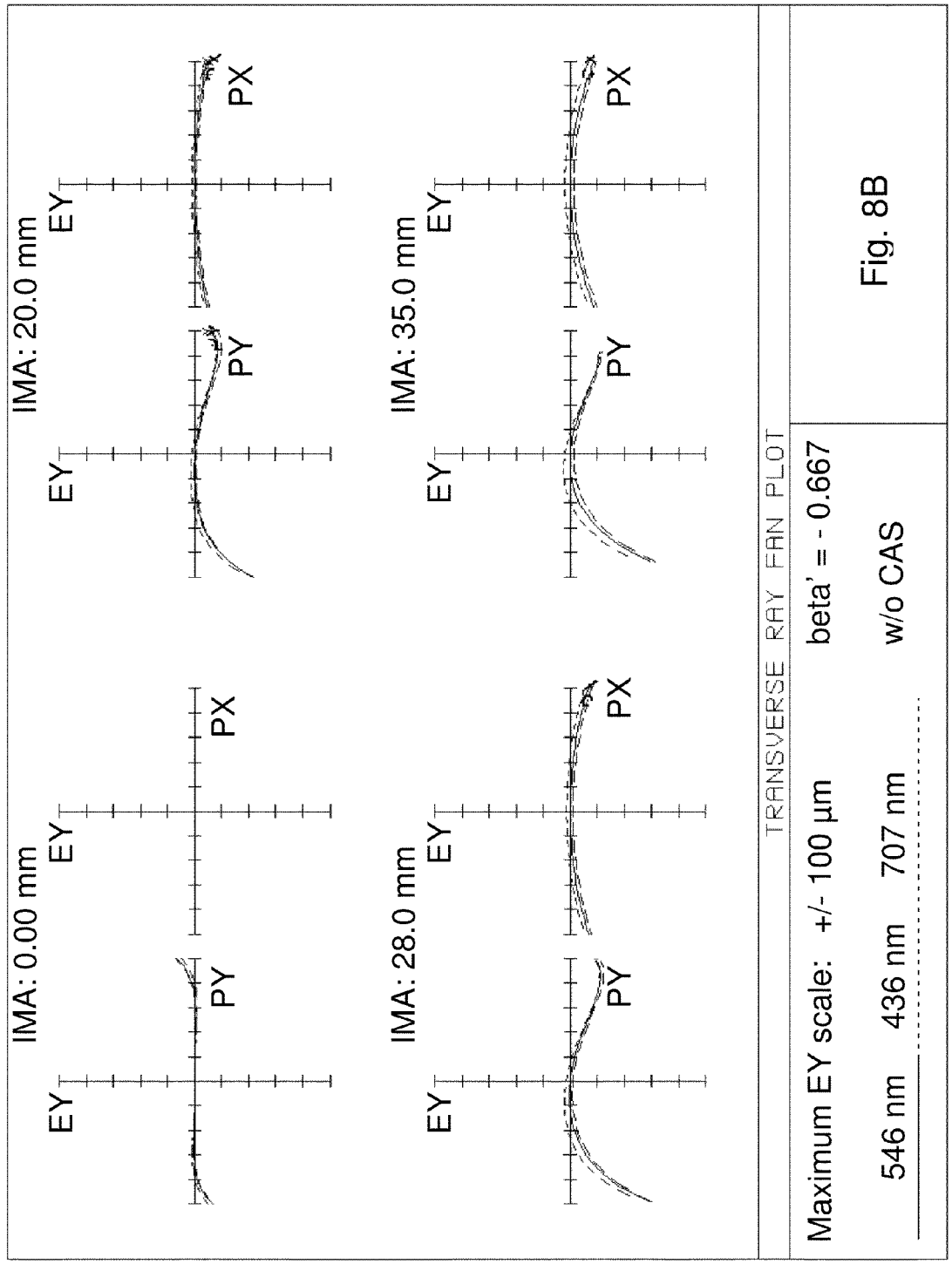
Figure 9B:
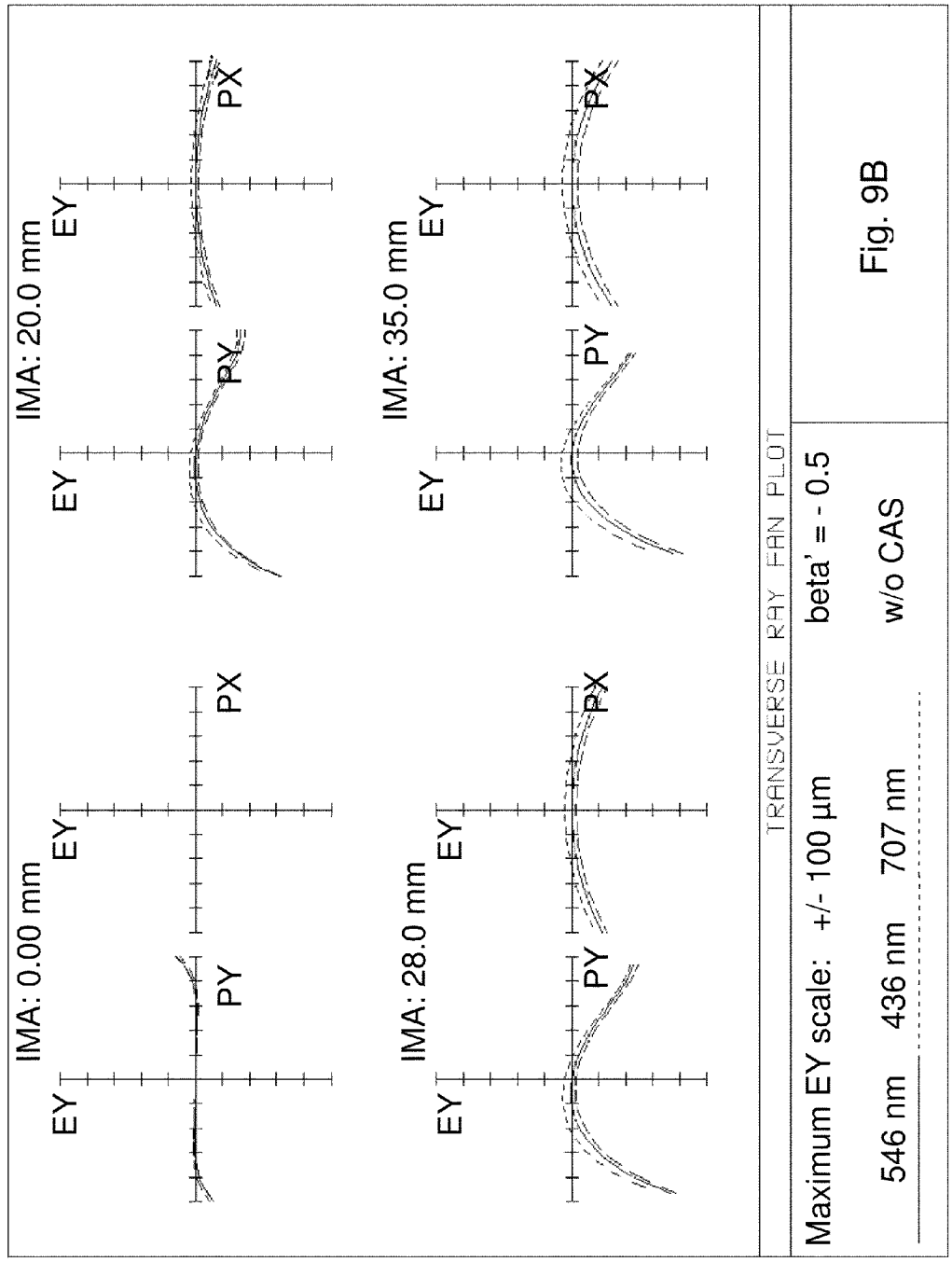
Figure 12C:
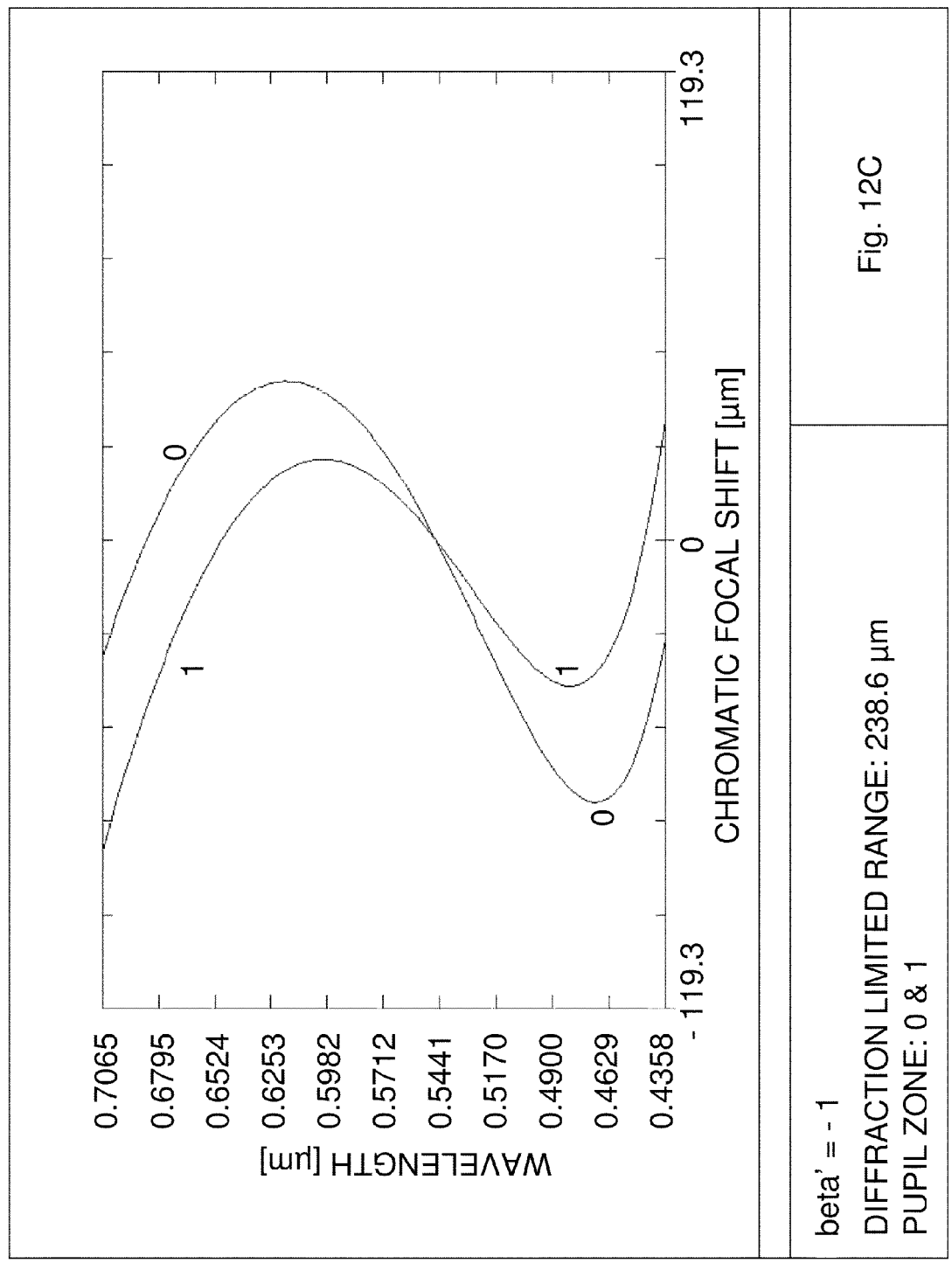
Figure 13B:
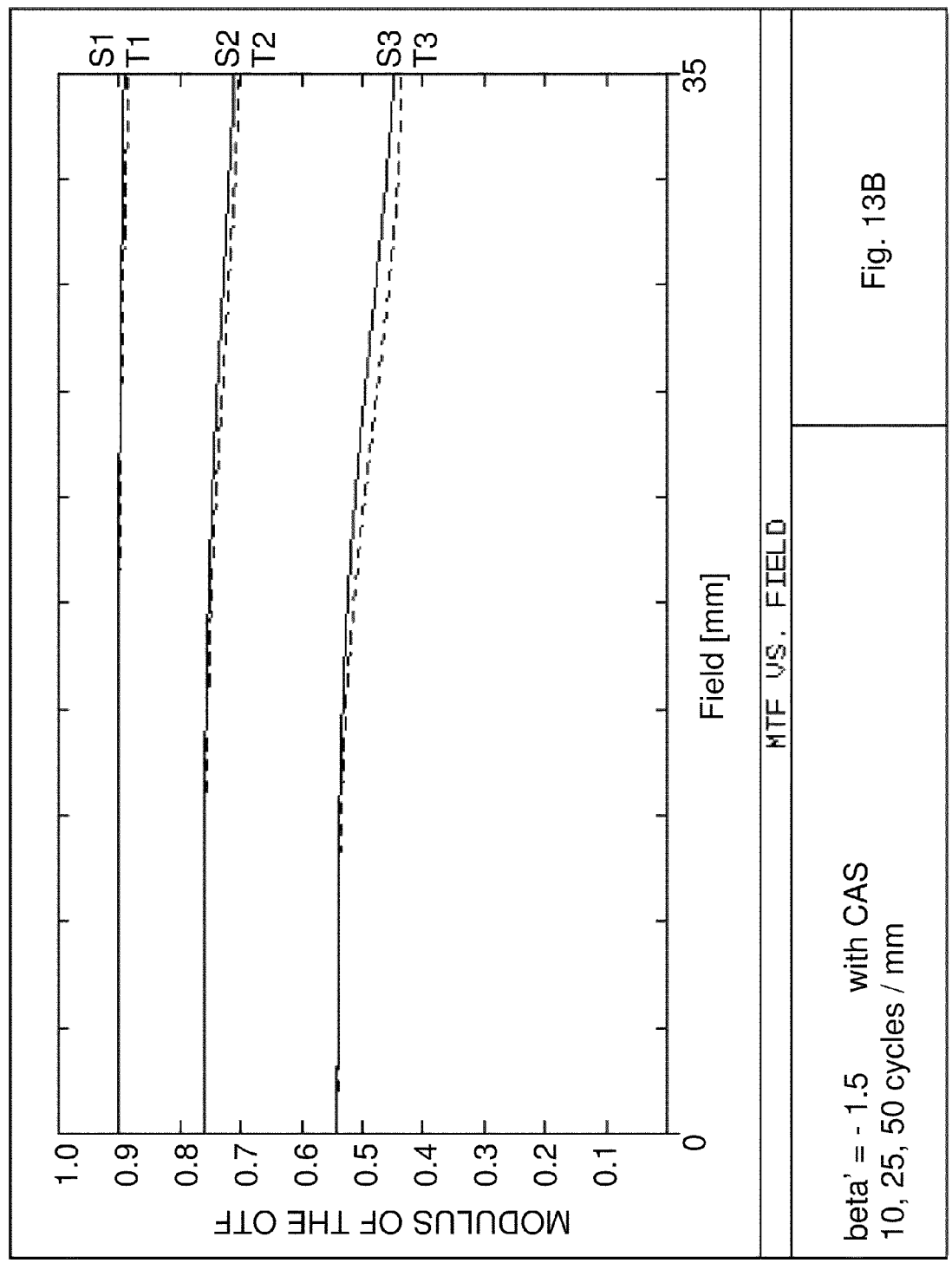
Figure 13C:
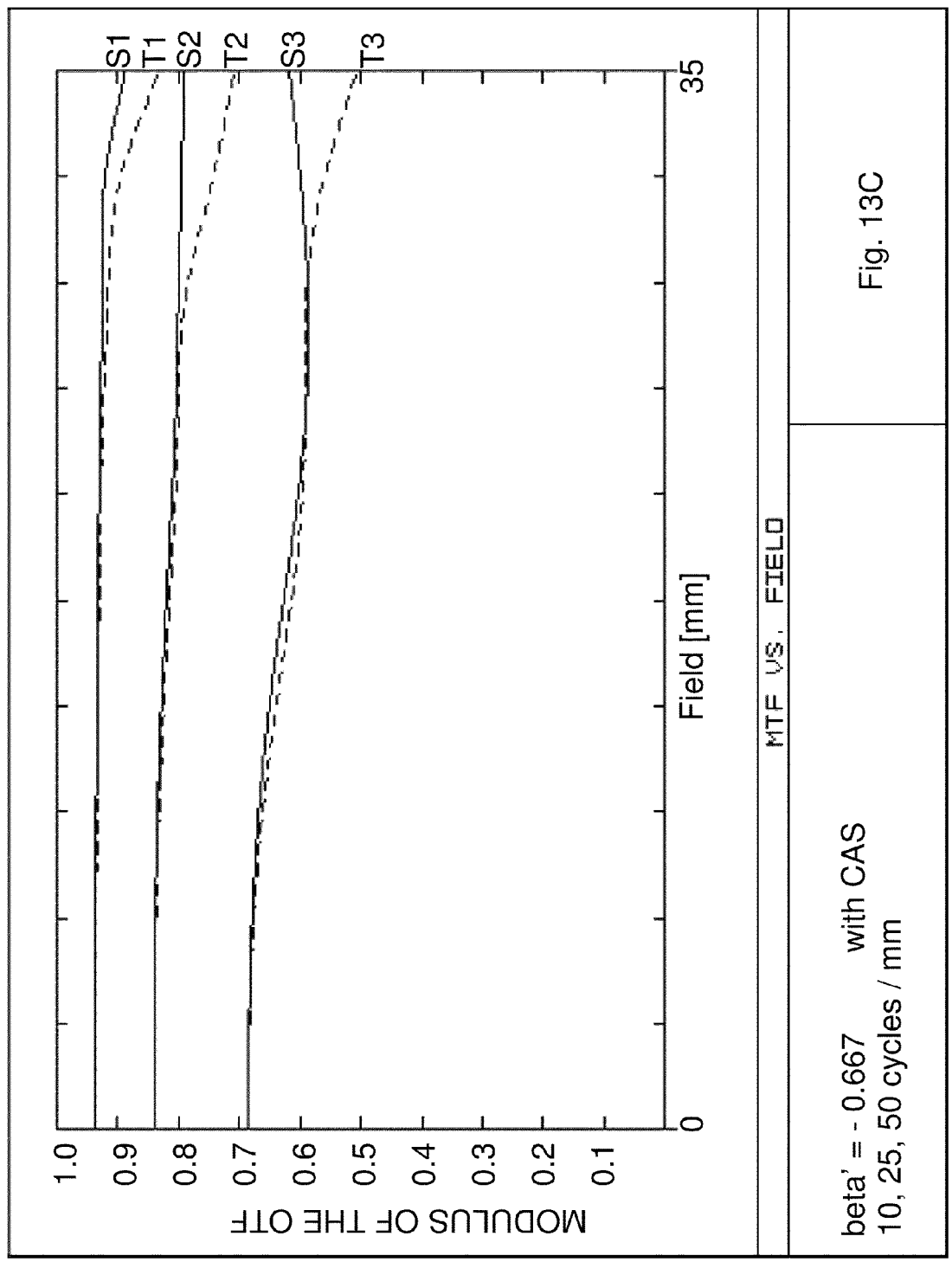
Figure 13D:
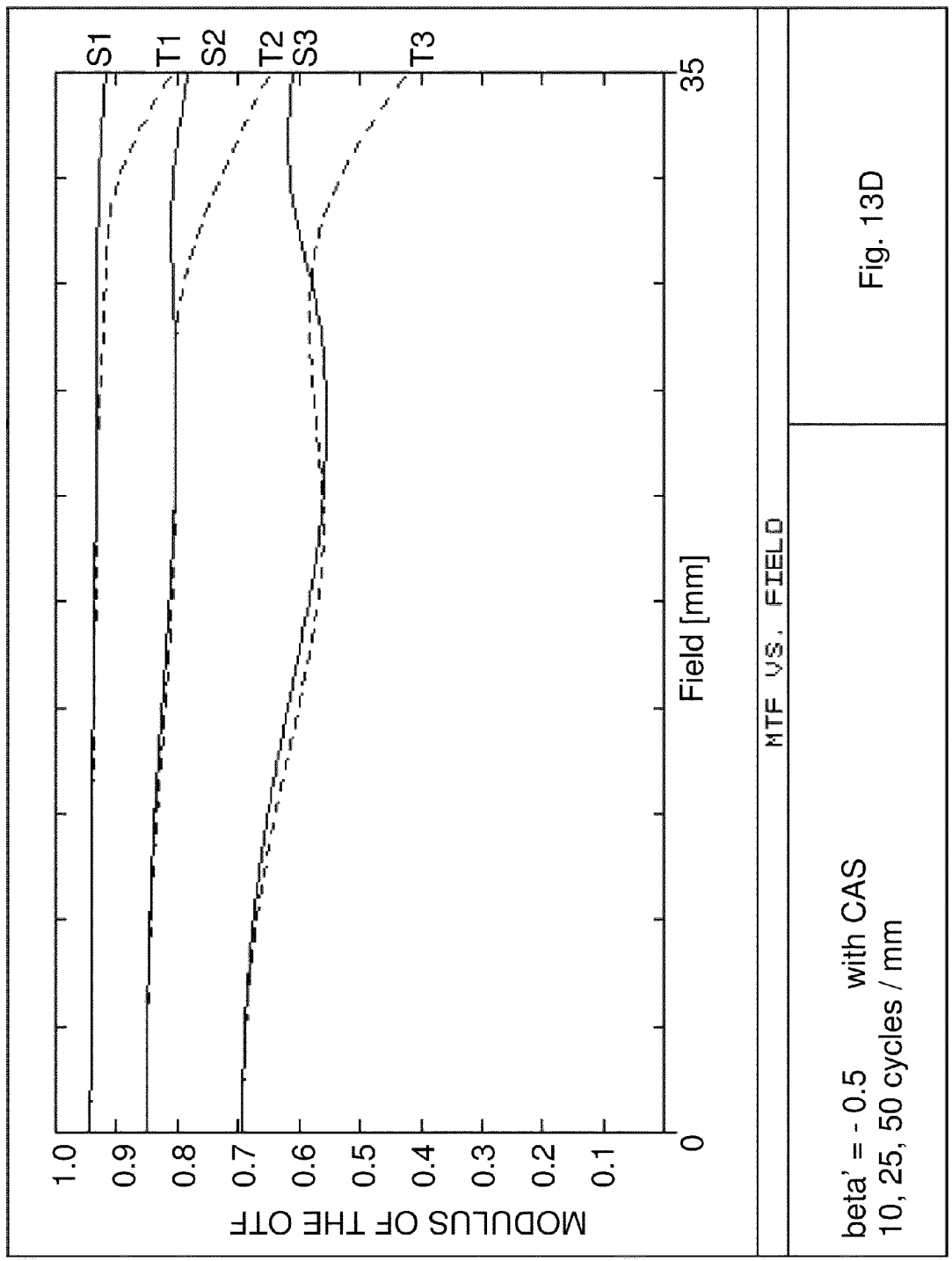
Figure 14B:
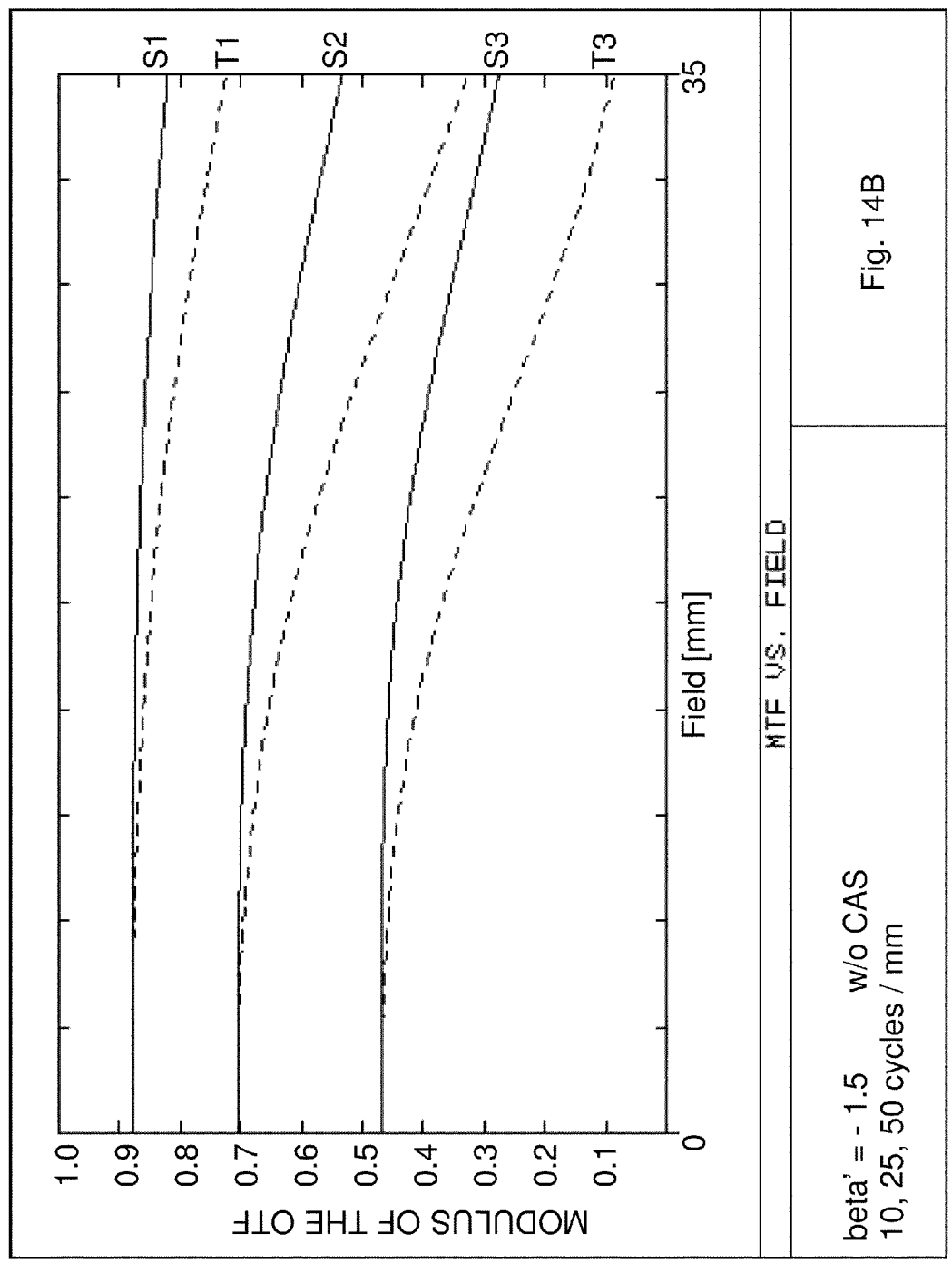
Figure 14C:
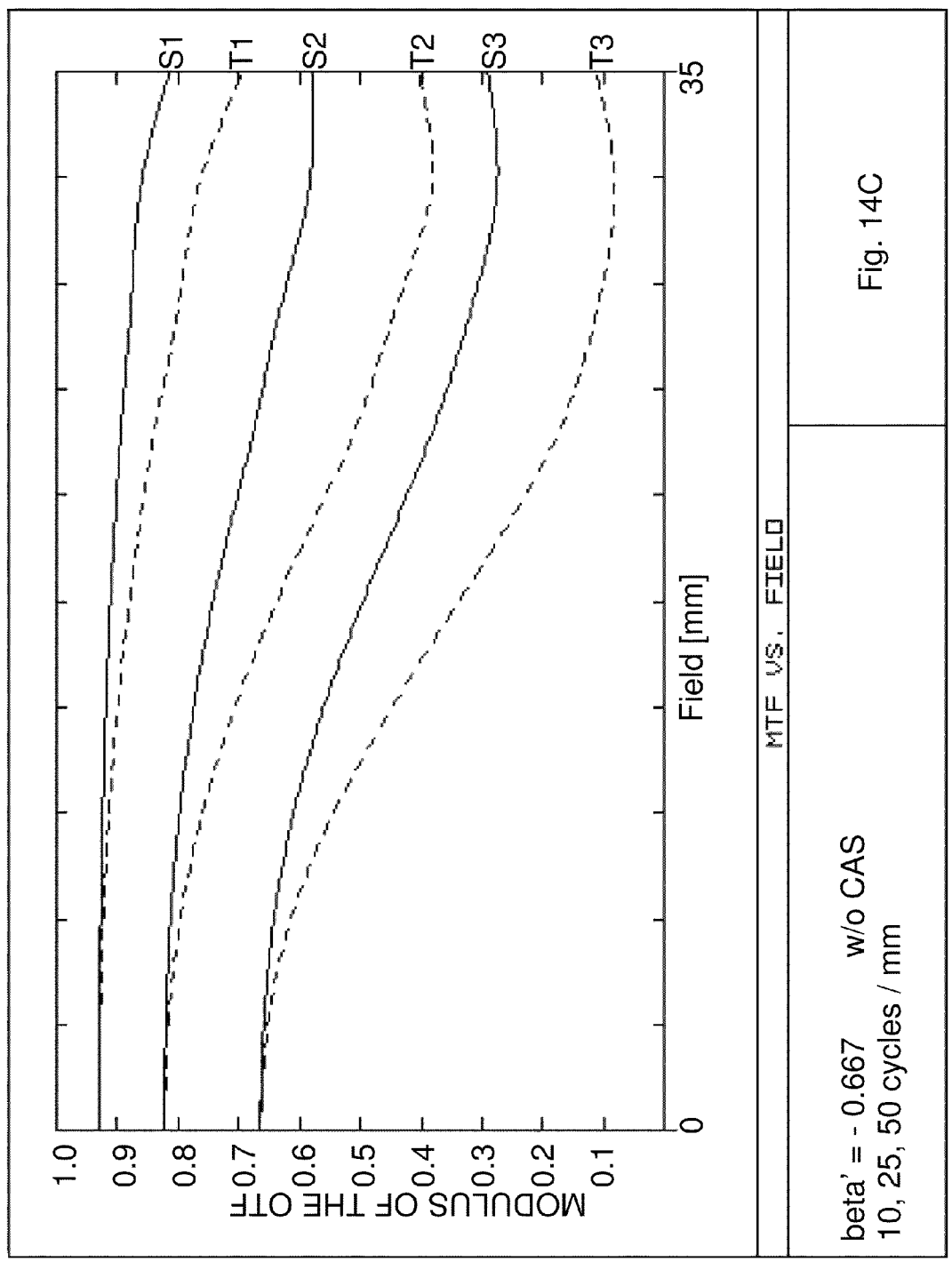
Figure 14D:
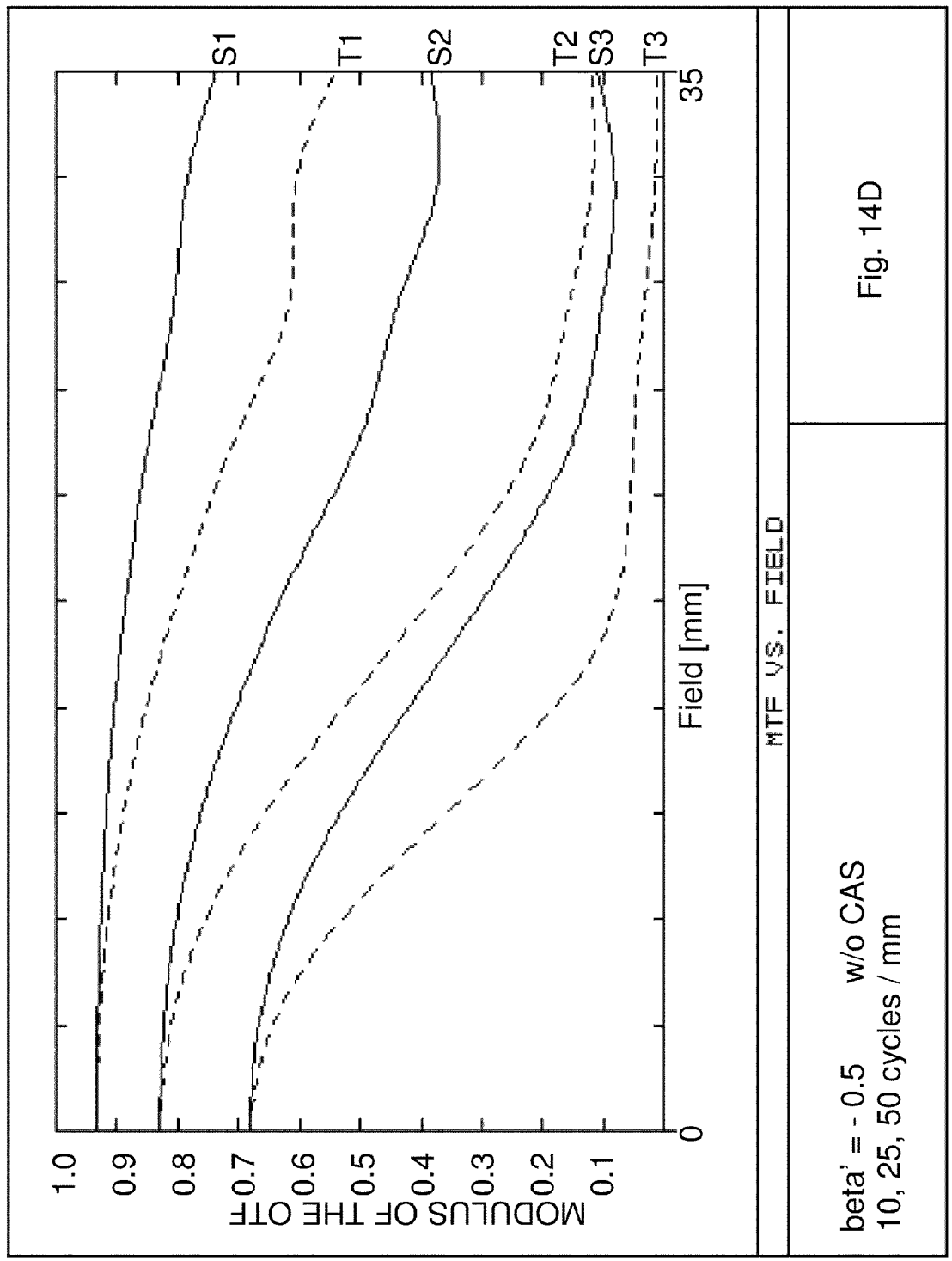

FIG. 5A shows the graphs of the transverse ray aberrations of the macro objective as a function of the pupil coordinates given an activated CAS and a linear magnification of $\beta'$=−2.0 for the image field points y'=0; 20; 28 and 35 mm FIG. 5B shows the graphs of the transverse ray aberrations of the macro objective as a function of the pupil coordinates given a deactivated CAS and a linear magnification of −2.0 for the image field points y'=0; 20; 28 and 35 mm;

FIG. 6A shows the graphs of the transverse ray aberrations of the macro objective as a function of the pupil coordinates given an activated CAS and a linear magnification of $\beta'$=−1.5 for the image field points y'=0; 20; 28 and 35 mm FIG. 6B shows the graphs of the transverse ray aberrations of the macro objective as a function of the pupil coordinates given a deactivated CAS and a linear magnification of −1.5 for the image field points y'=0; 20; 28 and 35 mm FIG. 7A shows the graphs of the transverse ray aberrations of the macro objective as a function of the pupil coordinates given an activated CAS and a linear magnification of $\beta'$=−1.0 for the image field points y'=0; 20; 28 and 35 mm FIG. 7B shows the graphs of the transverse ray aberrations of the macro objective as a function of the pupil coordinates given a deactivated CAS and a linear magnification of −1.0 for the image field points y'=0; 20; 28 and 35 mm;

FIG. 8A shows the graphs of the transverse ray aberrations of the macro objective as a function of the pupil coordinates given an activated CAS and a linear magnification of $\beta'$=−0.667 for the image field points y'=0; 20; 28 and 35 mm FIG. 8B shows the graphs of the transverse ray aberrations of the macro objective as a function of the pupil coordinates given a deactivated CAS and a linear magnification of −0.667 for the image field points y'=0; 20; 28 and 35 mm FIG. 9A shows the graphs of the transverse ray aberrations of the macro objective as a function of the pupil coordinates given an activated CAS and a linear magnification of $\beta'$=−0.5 for the image field points y'=0; 20; 28 and 35 mm FIG. 9B shows the graphs of the transverse ray aberrations of the macro objective as a function of the pupil coordinates given a deactivated CAS and a linear magnification of −0.5 for the image field points y'=0; 20; 28 and 35 mm;

FIG. 10A shows the graphs of the color magnification error of the macro objective for the centroid rays of the wavelengths r and g given a linear magnification of $\beta'$=−2.0;

FIG. 10B shows the graphs of the color magnification error of the macro objective for the centroid rays of the wavelengths r and g given a linear magnification of $\beta'$=−1.5;

FIG. 10C shows the graphs of the color magnification error of the macro objective for the centroid rays of the wavelengths r and g given a linear magnification of $\beta'$=−0.667;

FIG. 10D shows the graphs of the color magnification error of the macro objective for the centroid rays of the wavelengths r and g given a linear magnification of $\beta'$=−0.5;

FIG. 11A shows the graphs for the profiles of the meriodional and sagittal image shells and of the distortion of the macro objective for the major color e as a function of the image height, given a linear magnification of $\beta'$=−2.0;

FIG. 11B shows the graphs for the profiles of the meriodional and sagittal image shells and of the distortion of the macro objective for the major color e as a function of the image height, given a linear magnification of $\beta'$=−1.5;

FIG. 11C shows the graphs for the profiles of the meriodional and sagittal image shells and of the distortion of the macro objective for the major color e as a function of the image height, given a linear magnification of $\beta'$=−0.667;

FIG. 11D shows the graphs for the profiles of the meriodional and sagittal image shells and of the distortion of the macro objective for the major color e as a function of the image height, given a linear magnification of $\beta'$=−0.5;

FIG. 12A shows the graphs of the longitudinal color aberration as a function of the wavelength, given a linear magnification $\beta'$=−2.0;

FIG. 12B shows the graphs of the longitudinal color aberration as a function of the wavelength, given a linear magnification β'=−1.5;

FIG. 12C shows the graphs of the longitudinal color aberration as a function of the wavelength, given a linear magnification β'=−1.0;

FIG. 12D shows the graphs of the longitudinal color aberration as a function of the wavelength, given a linear magnification β'=−0.667;

FIG. 12E shows the graphs of the longitudinal color aberration as a function of the wavelength, given a linear magnification β'=−0.5;

FIG. 13A shows the modulation transfer function (MTF) as a function of the image height
given an activated CAS,
given a linear magnification β'=−2.0,
given a system initial aperture k=5.2, and
for the spatial frequencies 10, 25 and 50 lp/mm;

FIG. 13B shows the modulation transfer function (MTF) as a function of the image height
given an activated CAS,
given a linear magnification β'=−1.5,
given a system initial aperture k=5.2, and
for the spatial frequencies 10, 25 and 50 lp/mm;

FIG. 13C shows the modulation transfer function (MTF) as a function of the image height
given an activated CAS,
given a linear magnification β'=−0.667,
given a system initial aperture k=5.2, and
for the spatial frequencies 10, 25 and 50 lp/mm;

FIG. 13D shows the modulation transfer function (MTF) as a function of the image height
given an activated CAS,
given a linear magnification β'=−0.5,
given a system initial aperture k=5.2, and
for the spatial frequencies 10, 25 and 50 lp/mm;

FIG. 14A shows the modulation transfer function (MTF) as a function of the image height
given a deactivated CAS,
given a linear magnification β'=−2.0,
given a system initial aperture k=5.2, and
for the spatial frequencies 10, 25 and 50 lp/mm;

FIG. 14B shows the modulation transfer function (MTF) as a function of the image height
given a deactivated CAS,
given a linear magnification β'=−1.5,
given a system initial aperture k=5.2, and
for the spatial frequencies 10, 25 and 50 lp/mm;

FIG. 14C shows the modulation transfer function (MTF) as a function of the image height
given a deactivated CAS,
given a linear magnification β'=−0.667,
given a system initial aperture k=5.2, and
for the spatial frequencies 10, 25 and 50 lp/mm;

FIG. 14D shows the modulation transfer function (MTF) as a function of the image height
given a deactivated CAS,
given a linear magnification β'=−0.5,
given a system initial aperture k=5.2, and
for the spatial frequencies 10, 25 and 50 lp/mm.

SUMMARIZING INFORMATION RELATING TO THE ABERRATION GRAPHS

FIGS. 4A to 4E
the layout of the objective of the exemplary embodiments in five configurations linear magnification: −2, −1.5, −1, −0.667 and −0.5.

FIGS. 5A and 9B
Graphs of the transverse ray aberrations; for four selected field points of heights y'[mm]: 0, 20, 28 and 35, the dissection coordinate errors in the imaging plane are represented as a function of the pupil coordinates PY and PX. EY (PY) shows the meridional coma, EY (PX) shows the vertical component of the sagittal coma. The smallest interval on the abscissa axis is 20 μm. The high efficiency of the coma correction in the entire linear magnification may be seen from the comparison of the graphs (at the top with the activated inventive corrective compensation CAS, at the bottom with the deactivated CAS).

FIGS. 10A to 10D
Color magnification error; the transverse deviation relative to the centroid ray of the major color "e" is shown in image plane for all image heights for the centroid rays of the wavelengths "r", "g". The smallest interval on the abscissa axis is 0.1 μm.

FIGS. 11A to 11D
Field of curvature/distortion; for the major color "e", the profile of the meridional and sagittal image shell is represented as a function of the image height, as is the profile of the distortion. The smallest division interval in the distortion graph is 0.02%.

FIGS. 12A to 12E
Longitudinal chromatic aberrations; the back focus difference is represented as a function of the wavelength for the relative entrance pupil height $h_r=0$ and $h_r=1$.

The maximum abscissa value shown in μm corresponds to a wave-optical depth of field $b'_{0.8}$ (line "e").

FIGS. 13A to 14D
MTF; the imaging performance of the inventive objective is shown in FIGS. 13A to 13D as a function of the image height given the system initial aperture k=5.2, and for the spatial frequencies 10, 25 and 50 lp/mm.

FIGS. 14A to 14D show the MTF for identical imaging parameters, but with a deactivated CAS.

CAS=Continuous Aberration Suppression

Figure 2:
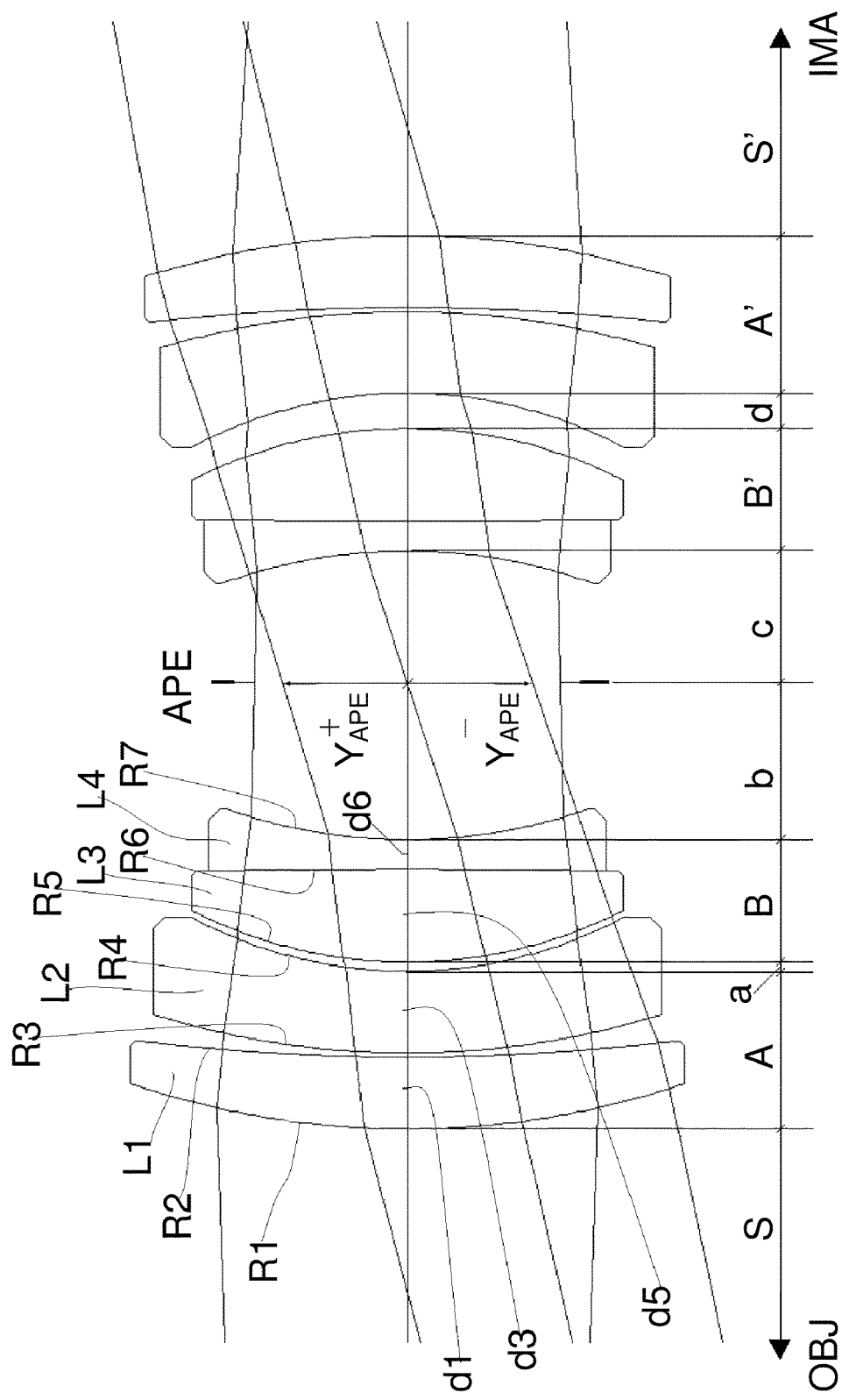
FIG. 2 shows an illustration of the optical design of the macro objective, following the designations of FIG. 1.

The technical data of advantageous designs of the macro objective illustrated in FIG. 2 are listed in tables 1 to 5. In detail:

Table 1 (above) shows a list of the ranges of the design parameters; the radii, thicknesses and air spaces, the refractive indices and the Abbe numbers of the macro objective illustrated in FIG. 2 (data are referred to the system focal length);

Table 2 (above) shows an overview of the extent of the pencil;

TABLE 3

| Reference symbol | Radius | Thickness |
|---|---|---|
| OBJ | — | — |
| R1 | 40.2957 | |
| d1 | | 3.3610 |
| R2 | 103.3874 | |
| d2 | | 0.2000 |
| R3 | 40.0797 | |
| d3 | | 3.8298 |
| R4 | 21.5114 | |
| a | | var. |

TABLE 3-continued

| Reference symbol | Radius | Thickness |
|---|---|---|
| R5 | 22.3300 | |
| d5 | | 4.3541 |
| R6 | −532.7755 | |
| d6 | | 1.3790 |
| R7 | 25.5872 | |
| b | | var. |
| APE | — | |
| c | | var. |
| R9 | −25.5872 | |
| d9 | | 1.3790 |
| R10 | 532.7755 | |
| d10 | | 4.3541 |
| R11 | −22.3300 | |
| d | | var. |
| R12 | −21.5114 | |
| d12 | | 3.8298 |
| R13 | −40.0797 | |
| d13 | | 0.2000 |
| R14 | −103.3874 | |
| d14 | | 3.3610 |
| R15 | −40.2957 | |
| IMA | — | — |

Figure 3:
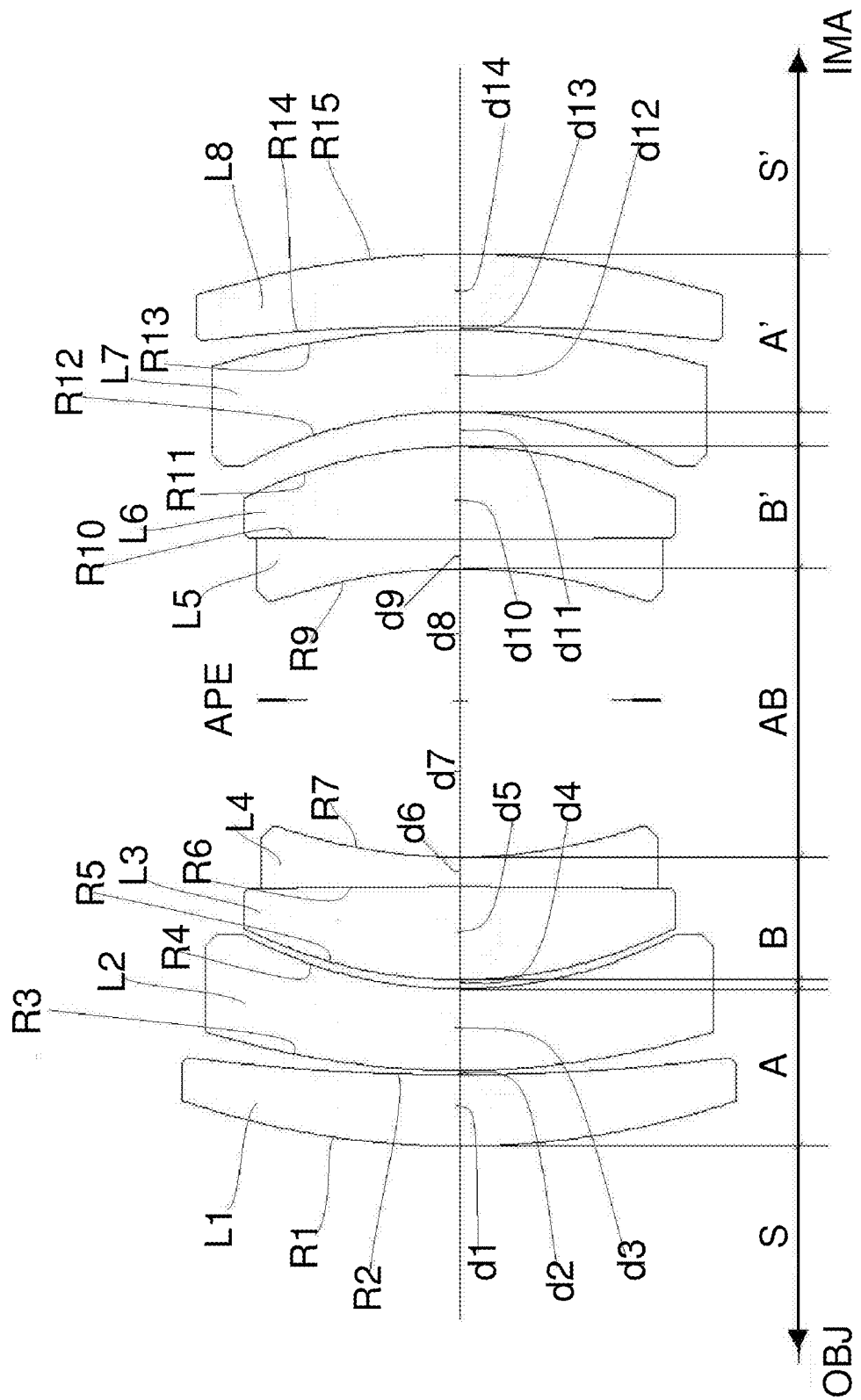
FIG. 3 shows a sequential illustration of the system as is customary in optical design, following the designations of FIG. 1.

Table 3 shows a list of the radii, the thicknesses and air spaces, the refractive indices and the Abbe numbers of a particular exemplary embodiment of the macro objective illustrated in FIG. 3 (data in mm);

TABLE 4

| β' | s | a | b | c | d | s' | f' |
|---|---|---|---|---|---|---|---|
| −0.5 | 277.72586 | 0.428354 | 7.375532 | 6.161454 | 1.642433 | 126.90085 | 100.00023 |
| −0.667 | 227.58331 | 0.655374 | 7.148512 | 6.388474 | 1.415413 | 143.72917 | 100.00009 |
| −1 | 177.32673 | 1.035393 | 6.768493 | 6.768493 | 1.035394 | 177.27850 | 100.00008 |
| −1.5 | 143.75423 | 1.388107 | 6.415779 | 7.121207 | 0.682680 | 227.45924 | 100.00008 |
| −2 | 126.91469 | 1.642432 | 6.161454 | 7.375532 | 0.428355 | 277.55699 | 100.00023 |

Table 4 shows a list of the variable air spaces and the focal length of the particular exemplary embodiment from table 3 (data in mm); and Table 5 shows a list of the glass refractive indexes of the particular embodiment from table 3, given a temperature of 20° C. and a pressure of 1.0 atmospheres for selected wavelengths.

Figure 1:
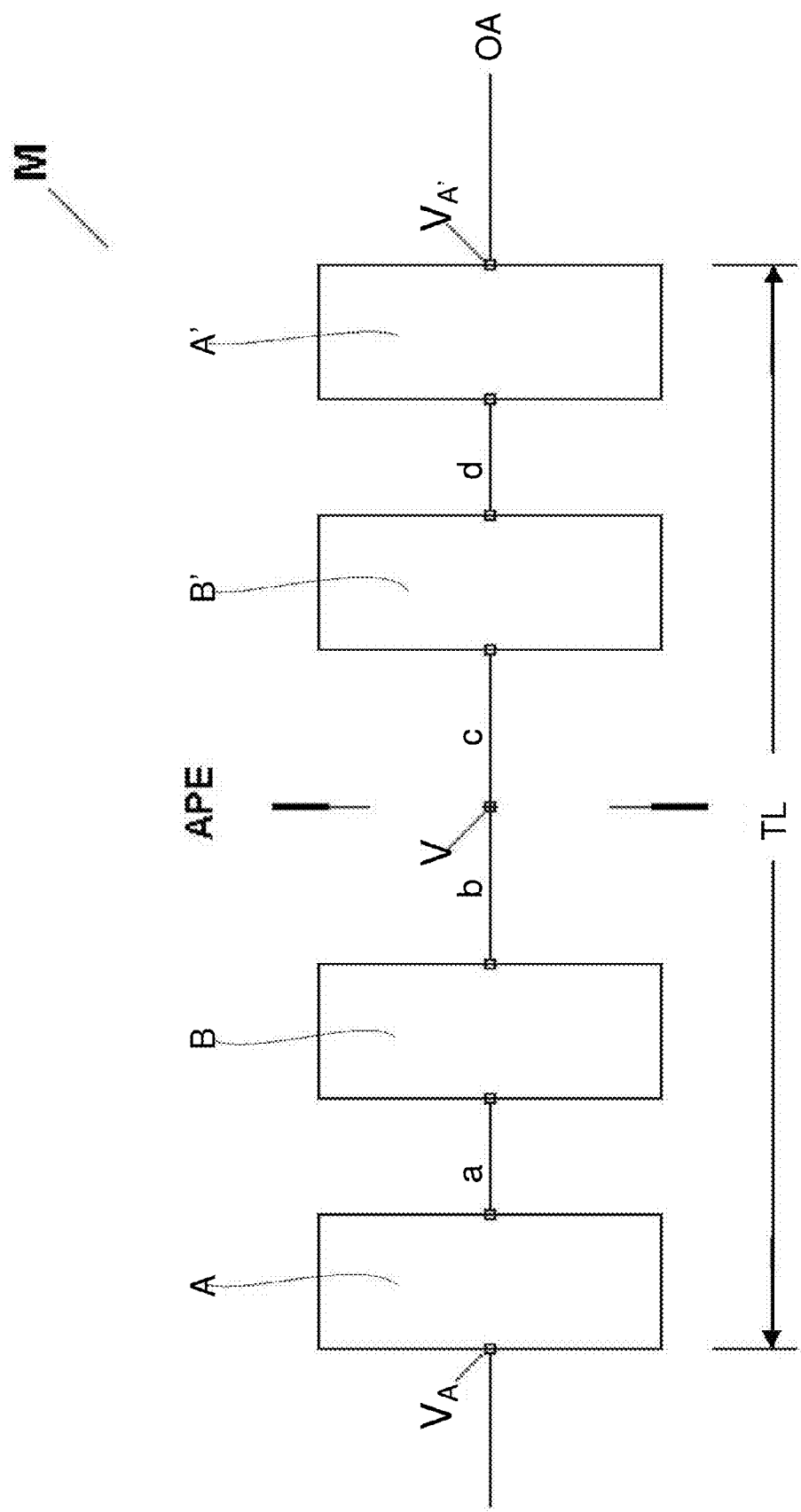
FIG. 1 shows a schematic of the design of the macro objective.

FIG. 1 shows a schematic of the inventive macro objective having the optical subassemblies A, B, B' and A', the lengths of which are likewise denoted by A, B, B' and A'. The objective has the air spaces a, b, c and d between the optical subassemblies. The macro objective has a constant total system length TL. The following are illustrated on the optical axis OA:

the vertex V (point of intersection with the optical axis) of the aperture stop APE in the system, the vertex $V_A$ of the first lens surface in the light direction in the system, and the vertex $V_{A'}$ of the last lens surface in the light direction in the system.

The air spaces a, b, c and d satisfy the symmetry condition, given the linear magnification β'=−1.0:

$(a+b)=(c+d)$ and $(a=d)$ and $(b=c)$

Given other linear magnifications within the range of β'=−2.0 to −0.5—alongside the usual displacement of the objective as a whole (see FIG. 3)—the optical subassemblies B and B' inside the objective are displaced jointly along the optical axis with the aid of mechanical means, the spacing (b+c) between the two subassemblies B and B' remaining constant during the displacement. The total length TL also remains constant. Thus, the distances a and d, in particular, are varied. It therefore holds that:

TABLE 5

| Reference symbol | Temp [° C.] | Pressure [atm] | n(479, 991) | n(587, 562) | n(643, 847) | n(546, 074) | n(435, 834) | n(706, 519) |
|---|---|---|---|---|---|---|---|---|
| s | 20.00 | 1.00 | 1.00000000 | 1.00000000 | 1.00000000 | 1.00000000 | 1.00000000 | 1.00000000 |
| d1 | 20.00 | 1.00 | 1.89947413 | 1.88298688 | 1.87756517 | 1.88813301 | 1.91047201 | 1.87297150 |
| d2 | 20.00 | 1.00 | 1.00000000 | 1.00000000 | 1.00000000 | 1.00000000 | 1.00000000 | 1.00000000 |
| d3 | 20.00 | 1.00 | 1.62380231 | 1.61336019 | 1.60987373 | 1.61663828 | 1.63070825 | 1.60687728 |
| a | 20.00 | 1.00 | 1.00000000 | 1.00000000 | 1.00000000 | 1.00000000 | 1.00000000 | 1.00000000 |
| d5 | 20.00 | 1.00 | 1.59893595 | 1.59239980 | 1.59019499 | 1.59446588 | 1.60316781 | 1.58830137 |
| d6 | 20.00 | 1.00 | 1.64914993 | 1.63774970 | 1.63395238 | 1.64132482 | 1.65670425 | 1.63069420 |
| b | 20.00 | 1.00 | 1.00000000 | 1.00000000 | 1.00000000 | 1.00000000 | 1.00000000 | 1.00000000 |
| c | 20.00 | 1.00 | 1.00000000 | 1.00000000 | 1.00000000 | 1.00000000 | 1.00000000 | 1.00000000 |
| d9 | 20.00 | 1.00 | 1.64914993 | 1.63774970 | 1.63395238 | 1.64132482 | 1.65670425 | 1.63069420 |
| d10 | 20.00 | 1.00 | 1.59893595 | 1.59239980 | 1.59019499 | 1.59446588 | 1.60316781 | 1.58830137 |
| d | 20.00 | 1.00 | 1.00000000 | 1.00000000 | 1.00000000 | 1.00000000 | 1.00000000 | 1.00000000 |
| d12 | 20.00 | 1.00 | 1.62380231 | 1.61336019 | 1.60987373 | 1.61663828 | 1.63070825 | 1.60687728 |
| d13 | 20.00 | 1.00 | 1.00000000 | 1.00000000 | 1.00000000 | 1.00000000 | 1.00000000 | 1.00000000 |
| d14 | 20.00 | 1.00 | 1.89947413 | 1.88298688 | 1.87756517 | 1.88813301 | 1.91047201 | 1.87297150 |
| s' | 20.00 | 1.00 | 1.00000000 | 1.00000000 | 1.00000000 | 1.00000000 | 1.00000000 | 1.00000000 |

$$(a+\Delta a)+(b+\Delta b)=(c+\Delta c)+(d+\Delta d)$$

and $$\Delta a=-\Delta b \; \Delta a=\Delta c$$

$$\Delta c=-\Delta d \text{ and } \Delta b=\Delta d$$

the designation Δ signifying the change in the variables following thereupon (and defined for β'=−1). As a result of these formulas:

$$\overline{V_A V}=\text{const and } \overline{VV_{A'}}=\text{const}$$

and, from this, $$\overline{V_A V_{A'}}=TL=\text{const.}$$

In FIG. 2, the optical design of the preferred embodiment of the macro objective is illustrated with reference to the variables of FIG. 1. In the illustration, the object plane OBJ is located on the left and the imaging plane IMA on the right. s denotes the back focus in the direction of the object plane OBJ, and s' the back focus in the direction of the image plane IMA.

The macro objective shown has the following elements when viewed in the specified sequence from the object plane:

a) a first positive optical subassembly a with a thickness of a, comprising a1) a first positive meniscus lens L1 with a thickness of d1, the convex surface R1 thereof pointing in the direction of the object plane OBJ, and the concave surface R2 pointing in the direction of the image plane IMA;

a2) a second negative meniscus lens L2 with a thickness of d3, the convex surface R3 thereof pointing in the direction of the object plane OBJ, and the concave surface R4 pointing in the direction of the image plane;

there is an air space d2 between the lenses L1 and L2;

b) a second nearly afocal optical subassembly B with a thickness B, comprising, b1) a third positive biconvex lens L3 with a thickness of d5, the more strongly curved first convex surface R5 thereof pointing in the direction of the object plane OBJ, and the second more weakly curved convex surface R6 pointing in the direction of the image plane IMA;

the air space a is between the lenses L2 and L3;

b2) a fourth negative biconcave lens L4 with a thickness of d6, the less strongly curved first concave surface R6 thereof pointing in the direction of the object plane OBJ, and the second more strongly curved concave surface R7 pointing in the direction of the image plane IMA;

the lenses L3 and L4 are cemented;

c) a stop APE;

the air space b is between the lens 4 and the stop APE;

d) a third nearly afocal optical subassembly B' with a thickness of B';

the air space c is between the optical subassembly B' and the stop APE;

e) a fourth positive optical subassembly A'.

The third optical subassembly B' having the lenses L5 and L6, and the fourth positive optical subassembly A' having the lenses L7 and L8 are designed with mirror symmetry relative to the optical subassemblies A and B upstream of the stop APE. However, the distance d is between the third and fourth optical subassemblies B' and A'. The individual radii and thicknesses are denoted in FIG. 2.

Particular values are to be found in the tables.

In a fashion corresponding to FIG. 2, FIG. 3 shows the exemplary configuration in a sequential arrangement of the surfaces. Table 3 relates to this illustration.

FIGS. 4A to 4E illustrate the configurations of object (OBJ), macro objective (M) and image (IMA) for five different linear magnifications, specifically for β'=−2.0; −1.5; −1.0; −0.667 and −0.5. The configurations illustrated show schematically the relationships between the total system length TL of the macro objective (M), the object-side and image-side back focuses s and s', respectively, and the scale ratios between the object and image, given the abovenamed linear magnifications. FIGS. 5A to 9B show the transverse ray aberrations of the preferred macro objective as a function of the pupil coordinates. The graphs (FIGS. 5A-9A) are illustrated for an activated CAS and the linear magnifications β'=−2.0; −1.5; −1.0; −0.667; −0.5. These graphs are likewise illustrated for a deactivated CAS (FIGS. 5B to 9B). Given a deactivated CAS, the nearly afocal optical subassemblies B, B' are located in the middle, symmetrical position.

The high efficiency of the coma correction in the entire linear magnification range becomes clear from the comparison of the graphs (with an activated or deactivated, respectively, inventive corrective compensation CAS).

The graphs of FIGS. 10A to 10D show the color magnification errors for various values of β', given an activated CAS.

As may be seen, the color magnification errors are very small over all wavelengths, image heights and linear magnifications.

The graphs of the meridional (T) and sagittal (S) image shells of the field of curvature (left-hand graph) and the distortion (right-hand graph) of the preferred macro objective (M) are illustrated in FIGS. 11A to 11D.

The graphs of the longitudinal chromatic error (x-axis) are illustrated in FIGS. 12A to 12E as a function of the wavelength (y-axis). They show the profile in the case of the linear magnifications β=−2.0; −1.5; −0.667 and −0.5, and respectively for the relative entrance pupil height $h_r$=0 and $h_r$=1. The back focus difference is illustrated as a function of the wavelength in the graphs.

FIGS. 13A to 13D show the modulation transfer function (MTF), given an activated CAS for the linear magnifications β'=−2.0; −1.5; −0.667 and −0.5. The system initial aperture is k=5.2. The profiles are respectively illustrated for the spatial frequencies 10 (S1, T1), 25 (S2, T2) and 50 (S3, T3) line pairs per mm. In this case, the graphs show the modulation (y-axis) as a function of the image height (x-axis). The solid line relates to radially oriented structures, and the dashed line to tangentially oriented structures.

FIGS. 14A to 14D show the modulation transfer function (MTF) in the same way, but for a deactivated CAS.

REFERENCE SYMBOLS

M Macro objective
A First positive optical subassembly and thickness thereof
B Second afocal optical subassembly and thickness thereof
B' Third afocal optical subassembly and thickness thereof
A' Fourth positive optical subassembly and thickness thereof
a Air space
b Air space
c Air space
d Air space
APE Aperture stop
V Vertex of the aperture stop APE
$V_A$ Vertex of the first (in light direction) lens surface in the system V_{A'} Vertex of the last (in light direction) lens surface in the system
TL Total system length
OA Optical axis
L1 First positive meniscus lens
R1 First surface of the first positive meniscus lens or radius thereof
d1 Thickness of the first positive meniscus lens
R2 Second surface of the first positive meniscus lens or radius thereof.
Air space
L2 Second negative meniscus lens
R3 First surface of the second negative meniscus lens or radius thereof.
d3 Thickness of the second negative meniscus lens
R4 Second surface of the second negative meniscus lens or radius thereof.
d4 Air space
L3 Third positive biconvex lens
R5 First surface of the third positive biconvex lens or radius thereof
d5 Thickness of the third positive biconvex lens
R6 Second surface of the third positive biconvex lens, and first surface of the fourth negative biconcave lens or radii thereof
L4 Fourth negative biconcave lens
d6 Thickness of the fourth negative biconcave lens
R7 Second surface of the fourth negative biconcave lens or radius thereof.
d7 Air space
d8 Air space
L5 Fifth negative biconcave lens
R9 First surface of the fifth negative biconcave lens or radius thereof
d9 Thickness of the fifth negative biconcave lens
R10 Second surface of the fifth negative biconcave lens, and first surface of the sixth positive biconvex lens or radii thereof
L6 Sixth positive biconvex lens
d10 Thickness of the sixth positive biconvex lens
R11 Second surface of the sixth positive biconvex lens or radius thereof
d11 Air space
L7 Seventh negative meniscus lens
R12 First surface of the seventh negative meniscus lens or radius thereof.
d12 Thickness of the seventh negative meniscus lens
R13 Second surface of the seventh negative meniscus lens or radius thereof.
d13 Air space
L8 Eighth positive meniscus lens
R14 First surface of the eighth positive meniscus lens or radius thereof
d14 Thickness of the eighth positive meniscus lens
R15 Second surface of the eighth positive meniscus lens or radius thereof
s Back focus referred to the first system vertex in light direction
s' Back focus referred to the last system vertex in light direction
OBJ Object plane

LIST OF CITED REFERENCES (1) Maréchal, A.: Optique geometrique generate [General Geometric Optics] in Handbuch der Physik [Textbook of Physics] (published by S. Flügge), Vol. XXIV, Grundlagen der Optik [Fundamentals of Optics], Springer Verlag, Berlin 1956
(2) Dietzsch, E.: Zur Tiefenabbildung der Pupille [Concerning depth imaging of the pupil], Feingerätetechnik 26 (1977) 1, pages 3-5
(3) Slyusarev, G. G.: Aberration and Optical Design Theory, Adam Hilger Ltd., Bristol 1984
(4) Wynne, C. G.: Proc. Phys. Soc. 65B 429-437 (1952)

The invention claimed is:

1. A macro objective of holosymmetric design for the measure of magnification $\beta'=-1$, comprising the following elements when viewed in the specified sequence from an object plane:
   a first positive optical subassembly;
   a second nearly afocal optical subassembly;
   a third nearly afocal optical subassembly; and
   a fourth positive optical subassembly;
   the objective further comprising mechanical means for jointly displacing the second and third optical subassemblies (B, B') inside the macro objective along the optical axis, the spacing between the second and third subassemblies remaining constant during the displacement.

2. A macro objective as recited in claim 1 wherein an aperture stop is arranged in a stationary fashion (not also being moved) at the same spacing from the first lens vertex of the first subassembly and from the last lens vertex of the last subassembly.

3. A macro objective as recited in claim 1 wherein the total length of the macro objective remains unchanged during the joint displacement of the second and third afocal optical subassemblies.

4. A macro objective as recited in claim 1 wherein, during the joint displacement of the second and third optical subassemblies, the focal length of the macro objective changes by at most $10^5$ multiplied by the focal length of the macro objective given a symmetrical position of the second and third optical subassemblies inside the macro objective.

5. A macro objective having the following elements when viewed in the specified sequence from the object plane:
   a) a first positive optical subassembly, comprising
      a1) a first positive lens, and
      a2) a second negative lens;
   b) a second nearly afocal optical subassembly, comprising
      b1) a third positive lens, and
      b2) a fourth negative lens;
   c) a stop;
   d) a third nearly afocal optical subassembly; and
   e) a fourth positive optical subassembly;
   the third optical subassembly and the fourth positive optical subassembly being designed with mirror symmetry relative to the optical subassemblies upstream of the stop.

6. A macro objective as recited in claim 5, wherein the radii, thicknesses, media refractive indices $n_d$ and Abbe numbers $v_d$ of the lenses are to be found in the following value ranges:

| Reference symbol N | Radius R [in units of system focal length $f_e$] | Thickness d [in units of the system focal length $f_e$] | Media refractive index $n_d$ | Abbe number $v_d$ |
|---|---|---|---|---|
| R1 | 0.36 < R1 < 0.44 | | | |
| d1 | | 0.030 < d1 < 0.040 | 1.882997 | 40.76 |

-continued

| Reference symbol N | Radius R [in units of system focal length $f_e$] | Thickness d [in units of the system focal length $f_e$] | Media refractive index $n_d$ | Abbe number $v_d$ |
|---|---|---|---|---|
| R2 | 0.93 < R2 < 1.14 | | | |
| R3 | 0.36 < R3 < 0.44 | | | |
| d3 | | 0.034 < d3 < 0.042 | 1.613360 | 44.49 |
| R4 | 0.19 < R4 < 0.24 | | | |
| R5 | 0.20 < R5 < 0.25 | | | |
| d5 | | 0.038 < d5 < 0.048 | 1.592400 | 68.40 |
| R6 | −5.9 < R6 < −4.8 | | | |
| d6 | | 0.12 < d6 < 0.015 | 1.637750 | 42.41 |
| R7 | 0.23 < R7 < 0.29 | | | |
| b, c | | 0.12 < (b + c) < 0.15 | | | the media refractive indices $n_d$ being specified for the Fraunhofer line d ($\lambda$=587.5618 nm), and the Abbe numbers $v_d$ being specified for the Fraunhofer line d ($\lambda$=587.5618 nm).

7. A macro objective having the following elements when viewed in the specified sequence from the object plane:
a) a first positive optical subassembly, comprising
a1) a first positive meniscus lens, and
a2) a second negative meniscus lens;
b) a second nearly afocal optical subassembly, comprising
b1) a third positive biconvex lens, and
b2) a fourth negative biconcave lens;
c) a stop;
d) a third nearly afocal optical subassembly; and
e) a fourth positive optical subassembly;
the third optical subassembly and the fourth positive optical subassembly being designed with mirror symmetry relative to the optical subassemblies upstream of the stop.

8. A macro objective as recited in claim 7, wherein the radii, thicknesses, media refractive indices $n_d$ and Abbe numbers $v_d$ of the lenses are to be found in the following value ranges:

| Reference symbol n | Radius R [in units of system focal length $f_e$] | Thickness d [in units of the system focal length $f_e$] | Media refractive index $n_d$ | Abbe number $v_d$ |
|---|---|---|---|---|
| R1 | 0.36 < R1 < 0.44 | | | |
| d1 | | 0.030 < d1 < 0.040 | 1.882997 | 40.76 |
| R2 | 0.93 < R2 < 1.14 | | | |
| R3 | 0.36 < R3 < 0.44 | | | |
| d3 | | 0.034 < d3 < 0.042 | 1.613360 | 44.49 |
| R4 | 0.19 < R4 < 0.24 | | | |
| R5 | 0.20 < R5 < 0.25 | | | |
| d5 | | 0.038 < d5 < 0.048 | 1.592400 | 68.40 |
| R6 | −5.9 < R6 < −4.8 | | | |
| d6 | | 0.12 < d6 < 0.015 | 1.637750 | 42.41 |
| R7 | 0.23 < R7 < 0.29 | | | |
| b, c | | 0.12 < (b + c) < 0.15 | | | the media refractive indices $n_d$ being specified for the Fraunhofer line d ($\lambda$=587.5618 nm), and the Abbe numbers $v_d$ being specified for the Fraunhofer line d ($\lambda$=587.5618 nm).

9. A macro objective as recited in claim 7 wherein the stop is arranged in a stationary fashion (not also being moved) at the same spacing from the first lens vertex of the first subassembly and from the last lens vertex of the last subassembly.

10. A macro objective as recited in claim 7 wherein, during the joint displacement of the second and third optical subassemblies, the focal length of the macro objective changes by at most $10^{-5}$ multiplied by the focal length of the macro objective given a symmetrical position of the second and third optical subassemblies inside the macro objective.

11. A macro objective having the following elements when viewed in the specified sequence from the object plane:
a) a first positive optical subassembly, comprising
a1) a first positive meniscus lens, the convex surface thereof pointing in the direction of the object plane, and the concave surface pointing in the direction of the image plane, and
a2) a second negative meniscus lens, the convex surface thereof pointing in the direction of the object plane, and the concave surface pointing in the direction of the image plane,
b) a second nearly afocal optical subassembly, comprising
b1) a third positive biconvex lens, the more strongly curved first convex surface thereof pointing in the direction of the object plane, and the second more weakly curved convex surface pointing in the direction of the image plane, and
b2) a fourth negative biconcave lens, the less strongly curved first concave surface thereof pointing in the direction of the object plane, and the second more strongly curved concave surface pointing in the direction of the image plane;
c) a stop;
d) a third nearly afocal optical subassembly; and
e) a fourth positive optical subassembly;
the third optical subassembly and the fourth positive optical subassembly being designed with mirror symmetry relative to the optical subassemblies upstream of the stop.

12. A macro objective as recited in claim 11, wherein the radii, thicknesses, media refractive indices $n_d$ and Abbe numbers $v_d$ of the lenses are to be found in the following value ranges:

| Reference symbol n | Radius R [in units of system focal length $f_e$] | Thickness d [in units of the system focal length $f_e$] | Media refractive index $n_d$ | Abbe number $v_d$ |
|---|---|---|---|---|
| R1 | 0.36 < R1 < 0.44 | | | |
| d1 | | 0.030 < d1 < 0.040 | 1.882997 | 40.76 |
| R2 | 0.93 < R2 < 1.14 | | | |
| R3 | 0.36 < R3 < 0.44 | | | |
| d3 | | 0.034 < d3 < 0.042 | 1.613360 | 44.49 |
| R4 | 0.19 < R4 < 0.24 | | | |
| R5 | 0.20 < R5 < 0.25 | | | |
| d5 | | 0.038 < d5 < 0.048 | 1.592400 | 68.40 |
| R6 | −5.9 < R6 < −4.8 | | | |
| d6 | | 0.12 < d6 < 0.015 | 1.637750 | 42.41 |
| R7 | 0.23 < R7 < 0.29 | | | |
| b, c | | 0.12 < (b + c) < 0.15 | | | the media refractive indices $n_d$ being specified for the Fraunhofer line d ($\lambda$=587.5618 nm), and the Abbe numbers $v_d$ being specified for the Fraunhofer line d ($\lambda$=587.5618 nm).

13. A macro objective as recited in claim 11 wherein the total length of the macro objective remains unchanged during the joint displacement of the second and third afocal optical subassemblies.

14. A macro objective as recited in claim 11 wherein, during the joint displacement of the second and third optical subassemblies, the focal length of the macro objective changes by at most $10^{-5}$ multiplied by the focal length of the macro objective given a symmetrical position of the second and third optical subassemblies inside the macro objective.

15. A macro objective comprising the following elements when viewed in the specified sequence from an object plane:
- a first positive optical subassembly;
- a second nearly afocal optical subassembly;
- a third nearly afocal optical subassembly; and
- a fourth positive optical subassembly;
- the objective further comprising mechanical means for jointly displacing the second and third optical subassemblies (B, B') inside the macro objective along the optical axis, the spacing between the second and third subassemblies remaining constant during the displacement, wherein the radii, thicknesses, media refractive indices $n_d$ and Abbe numbers $v_d$ of the lenses are to be found in the following value ranges:

| Reference symbol n | Radius R [in units of system focal length $f'_e$] | Thickness d [in units of the system focal length $f'_e$] | Media refractive index $n_d$ | Abbe number $v_d$ |
|---|---|---|---|---|
| R1 | 0.36 < R1 < 0.44 | | | |
| d1 | | 0.030 < d1 < 0.040 | 1.882997 | 40.76 |
| R2 | 0.93 < R2 < 1.14 | | | |
| R3 | 0.36 < R3 < 0.44 | | | |
| d3 | | 0.034 < d3 < 0.042 | 1.613360 | 44.49 |
| R4 | 0.19 < R4 < 0.24 | | | |
| R5 | 0.20 < R5 < 0.25 | | | |
| d5 | | 0.038 < d5 < 0.048 | 1.592400 | 68.40 |
| R6 | −5.9 < R6 < −4.8 | | | |
| d6 | | 0.12 < d6 < 0.015 | 1.637750 | 42.41 |
| R7 | 0.23 < R7 < 0.29 | | | |
| b, c | | 0.12 < (b + c) < 0.15 | | | the media refractive indices $n_d$ being specified for the Fraunhofer line d ($\lambda$=587.5618 nm), and the Abbe numbers $v_d$ being specified for the Fraunhofer line d ($\lambda$=587.5618 nm).

16. A macro objective as recited in claim 15 wherein an aperture stop is arranged in a stationary fashion (not also being moved) at the same spacing from the first lens vertex of the first subassembly and from the last lens vertex of the last subassembly.

17. A macro objective as recited in claim 15 wherein the total length of the macro objective remains unchanged during the joint displacement of the second and third afocal optical subassemblies.

18. A macro objective as recited in claim 15 wherein, during the joint displacement of the second and third optical subassemblies, the focal length of the macro objective changes by at most $10^{-5}$ multiplied by the focal length of the macro objective given a symmetrical position of the second and third optical subassemblies inside the macro objective.

19. A macro objective as recited in claim 5 wherein the stop is arranged in a stationary fashion (not also being moved) at the same spacing from the first lens vertex of the first subassembly and from the last lens vertex of the last subassembly.

20. A macro objective as recited in claim 5 wherein the total length of the macro objective remains unchanged during the joint displacement of the second and third afocal optical subassemblies.

* * * * *